(12) United States Patent
Abtin et al.

(10) Patent No.: US 9,338,625 B2
(45) Date of Patent: May 10, 2016

(54) GEOGRAPHICALLY REDUNDANT AND MULTIPLE EATF NODES

(75) Inventors: Afshin Abtin, Sollentuna (SE); Fredrik Lindholm, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 47 days.

(21) Appl. No.: 14/357,198

(22) PCT Filed: Nov. 23, 2011

(86) PCT No.: PCT/EP2011/070874
§ 371 (c)(1),
(2), (4) Date: May 8, 2014

(87) PCT Pub. No.: WO2013/075746
PCT Pub. Date: May 30, 2013

(65) Prior Publication Data
US 2014/0370842 A1    Dec. 18, 2014

(51) Int. Cl.
*H04M 11/04*    (2006.01)
*H04W 4/22*    (2009.01)
*H04W 76/00*    (2009.01)
(Continued)

(52) U.S. Cl.
CPC .............. *H04W 4/22* (2013.01); *H04L 65/1069* (2013.01); *H04W 24/04* (2013.01); *H04W 36/0016* (2013.01); *H04W 64/00* (2013.01); *H04W 76/007* (2013.01); *H04W 88/10* (2013.01)

(58) Field of Classification Search
CPC ....... H04W 4/22; H04W 24/04; H04W 64/00; H04W 76/007

USPC ................................ 455/404.2, 436; 370/338
See application file for complete search history.

(56) References Cited

U.S. PATENT DOCUMENTS

| 2007/0149166 A1* | 6/2007 | Turcotte | H04W 4/22 455/404.1 |
| 2010/0124897 A1* | 5/2010 | Edge | H04M 7/123 455/404.1 |

FOREIGN PATENT DOCUMENTS

| WO | WO-2009089085 | 7/2009 |
| WO | WO-2011123794 | 10/2011 |

OTHER PUBLICATIONS

"3rd Generation Partnership Project; Technical Specification Group Core Network and Terminals; IP multimedia call control protocol based on Session Initiation Protocol (SIP) and Session Description Protocol (SDP); Stage 3 (Release 11)", 3GPP TS 24.229 V11.1.0, (Sep. 2011), pp. 1-704.

(Continued)

*Primary Examiner* — Marcos Batista
(74) *Attorney, Agent, or Firm* — Nicholson De Vos Webster & Elliott LLP

(57) ABSTRACT

An emergency access transfer function (EATF) node is described for use when hand over of a user equipment (UE) from a first to a second access network is performed during an emergency call session (ECS). The EATF node receives a request for transferring the ECS from the first access network to the second access network. The EATF node transfers the ECS of the UE from the first to the second access network when the ECS is known to the EATF node. The EATF node selects a second EATF node from a set of one or more EATF nodes when the ECS is unknown, and forwards the request for transferring the ECS to the second EATF node. The EATF node may be in a first network region and the second EATF node may be in the first or a second network region.

24 Claims, 14 Drawing Sheets

(51) Int. Cl.
  *H04L 29/06* (2006.01)
  *H04W 24/04* (2009.01)
  *H04W 36/00* (2009.01)
  *H04W 64/00* (2009.01)
  *H04W 88/10* (2009.01)

(56) References Cited

OTHER PUBLICATIONS

"3rd Generation Partnership Project; Technical Specification Group Services and System Aspects; IP Multimedia Subsystem (IMS) emergency sessions (Release 11)", 3GPP TS 23.167 V11.2.0, (Sep. 2011), pp. 1-41.

"3rd Generation Partnership Project; Technical Specification Group Services and System Aspects; IP Multimedia Subsystem (IMS); Stage 2 (Release 11)", 3GPP TS 23.228 V11.2.0, (Sep. 2011), pp. 1-274.

International Search Report, Application No. PCT/EP2011/070874, Jul. 5, 2012, 2 pages.

Written Opinion of the International Searching Authority, Application No. PCT/EP2011/070874, Jul. 5, 2012, 4 pages.

* cited by examiner

GEOGRAPHICALLY REDUNDANT AND MULTIPLE EATF NODES

CROSS-REFERENCE TO RELATED APPLICATIONS

This application is a National stage of International Application No. PCT/EP2011/070874, filed Nov. 23, 2011, which are hereby incorporated by reference.

TECHNICAL FIELD

The present invention relates to methods and apparatus for enabling the transfer of an emergency call session (ECS) from a first access network to a second access network with geographically redundant and/or multiple emergency access transfer function (EATF) nodes. More particularly, the invention relates to methods and apparatus for enabling EATF nodes not anchoring the ECS to forward the ECS to another EATF node anchoring the ECS.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

User equipment (UE) may comprise or represent any device used for communications. Examples of user equipment that may be used in certain embodiments of the described access networks are wireless devices such as mobile phones, terminals, smart phones, portable computing devices such as lap tops, handheld devices, tablets, netbooks, computers, personal digital assistants and other wireless communication devices.

FIG. 1a illustrates schematically a communications network architecture 100 including an IMS network 102, a first access network 104 such as an Long term evolution (LTE)/LTE Advanced access network and a second access network 106 such as a Global System for Mobile Communications (GSM)/Wideband Code Division Multiple Access (WCDMA) access network. Signals are directed to/from a user equipment 108 (UE-A), which initially communicates with the first access network 104 and a public address safety point (PSAP) 110 through the IMS network 102 during an ECS. The network entities or nodes within the first access network 104 connect the UE-A 108, which is an IMS subscriber, to IMS services provided by the IMS network 102. The first access network 104 includes various support nodes such as eNodeB base station(s) 112, which may connect via a Mobility Management Entity (MME) node 114 to a Mobile Switching Center (MSC) node 122 of the second access network 106, or connects via a Serving Gateway and Packet Data Network Gateway node (S&P GW) 116 to network entities or nodes (described below) of the IMS network 102. The second access network 106 may be a GSM/WCDMA network that includes various support entities or nodes such as a NodeB base station node (BTS NodeB) 118 that communicates with a Base Station Controller/Radio Network controller node (BSC/RNC) 120 and MSC node 122, which acts as an interface between the GSM/WCDMA backbone network, the first access network 104 and the IMS network 102.

The IMS network 102 includes network entities or nodes that send/receive signals to/from the first and second access networks 104 and 106, these nodes connect with the first and second access networks 104 and 106 via the S&P GW and MSC nodes 116 and 122. The IMS network nodes include Call/Session Control Function (CSCF) nodes, which operate as SIP proxies within the IMS network 102. The 3GPP architecture defines several types of CSCF nodes: the Proxy CSCF (P-CSCF) node 124 which is typically the first point of contact within the IMS network 102 for UE 108, which is SIP enabled; the Serving CSCF (S-CSCF) node provides services to the user that the user is subscribed to; and the Interrogating CSCF (I-CSCF) node 126 whose role is to identify the correct S-CSCF and to forward to that S-CSCF a request received from UE-A 108 via P-CSCF node 124. For simplicity, FIG. 1a shows the S-CSCF combined with the I-CSCF node 126.

The IMS network 102 also includes the multimedia gateway control function (MGCF) node 128, which acts as an interface between the second access network 106 and the IMS network 102, the MGCF node 128 performs call control protocol conversion between SIP messages and ISUP/BICC messages. It translates non-SIP signalling messages (ISUP/BICC) from the MSC node 122 into SIP messages used in the IMS network 102. The Service Centralization and Continuity Application Server (SCC-AS) 130 performs access domain selection and service domain selection for deciding the type of access network, packet switched or circuit switched network access, an IMS subscriber such as UE-A 108 may require. It also supports session anchoring and session and access transfer functionality. The IMS network 102 also includes an Access Transfer Control Function (ATCF), which is a signalling controller that, in this case, is incorporated with P-CSCF node 124. The Access Gateway and Access Transfer Gateway (AGW/ATGW) node 132 is a media anchor point. These facilitate rapid and predictable handover of a call session of UE-A 108 from the first access network 104 to the second access network 106 (i.e. from an LTE or LTE-Advanced network to circuit 2G/3G networks) and are used to update the necessary servers after an access transfer. This provides seamless call handover between the first access network 104 and the second access network 106 by reducing the number of network nodes for handover of an active voice call to the new access network.

In FIG. 1a the IMS network 102 is arranged for implementing IMS emergency services and further includes an Emergency CSCF (E-CSCF) node 134, a Location Retrieval Function (LRF) node 136, and an Emergency Access Transfer Function (EATF) node 138. For simplicity, not all functional components of the IMS network 102, e.g. the Interconnection Border Control Function (IBCF) and Breakout Gateway Control Function (BGCF) nodes, are shown in these or the following figures.

FIG. 1b is a signalling flow diagram illustrating an IMS emergency call (EC) setup of an ECS when UE-A 108 initiates an EC from the first access network 104. Initially, UE-A 108 places the EC when connected to the first access network 104 by sending a SIP Invite message including an International Mobile Equipment Identity (IMEI) number of UE-A 108 e.g. Invite (urn: service:sos; contact:+sip.instance="<"IMEI">"). The EC setup signalling flow shows the EC signalling being routed from UE-A 108 through the support nodes of the first access network 104 to the P-CSCF node 124 and then to the E-CSCF node 134. The E-CSCF node 134 is concerned with handling ECSs and is responsible for the routing of ECs to the correct emergency centre or PSAP 110. The E-CSCF node 134 has an interface to the LRF node 136, and the E-CSCF node 134 requests the LRF node 136 to retrieve location information relating to UE-A 108. The LRF node 136 also provides the E-CSCF with the PSAP 110 destination address. The E-CSCF node 134 also has an interface to the EATF node 138, which enables service continuity of IMS EC services and sessions. The E-CSCF node sends a SIP Invite request message including the IMEI to the EATF node 138, e.g. Invite (urn:service:sos; contact:+sip.instance="<"IMEI">"; route: EATF-URI; Route: E-CSCF-URI). The ECS of UE-A 108 is then anchored at EATF node 138.

According to 3GPP TS 24.229, when the EATF node 138 receives the SIP INVITE request with an emergency service uniform resource name (URN), the EATF node 138 stores the SIP INVITE request, anchors the ECS, acts as a specified node for a routing back-to-back user agent (B2BUA), and provides access or session transfer functionality until the ECS of UE-A 108 is terminated. The ECS of UE-A 108 is said to be known to, or known by, EATF node 138 when the EATF node 138 has stored the SIP INVITE request in relation to ECS of UE-A 108 and/or the ECS of UE-A 108 has been anchored by EATF node 138. The ECS of UE-A 108 is said to be unknown to, or unknown by, EATF node 138 when it has not stored the SIP INVITE request in relation to ECS of UE-A 108 and/or the ECS of UE-A 108 has not been anchored by EATF node 138.

The P-CSCF node 124, EATF node 138 and E-CSCF node 134 are located in the same serving network, which is the visited network when the UE-A 108 is roaming. Once anchored, the E-CSCF and EATF nodes 134 and 138 proceed with the EC setup to connect the ECS between UE-A 108 and PSAP 110.

Single Radio Voice Call Continuity (SRVCC) handover (HO) is described in 3GPP TS 23.237 and 3GPP TS 23.216, and allows handover of a voice call from the first access network 104 to the second access network 106, for example from packet switched access to circuit switched access (e.g. transfer of a VoIP IMS session from an E-UTRAN to a UTRAN/GERAN). During the ECS of UE-A 108, when the ECS is used in combination with SRVCC, the E-CSCF node 134 can invoke the EATF node 138, which is anchoring the ECS of UE-A 108 in the serving network, to transfer the ECS from the first access network 104 (e.g. a packet switched network) to the second access network 106 (e.g. a circuit switched network). EATF node 138 ensures that the new call leg over the second access network 106 (i.e. the Target Access Leg) is correlated with the ongoing ECS between UE-A 108 and PSAP 110 and is transferred correctly and seamlessly. The EATF node 138 enables SRVCC HO for the ECS from the first access network 104 (e.g. a packet-switched (PS) LTE/LTE Advanced access network) to the second access network 106 (e.g. a circuit switched (CS) GSM/WCDMA access network).

FIG. 1c is a signalling flow diagram illustrating an example of a session transfer (also known as a transfer or handover) of an IMS ECS of UE-A 108 from the first access network 104 to the second access network 106. As illustrated in FIG. 1b, when an IMS EC setup with the home network is performed the EATF node 138 within the serving network is the only node for anchoring the EC signalling and ECS in voice over LTE (VoLTE) deployments. In this example, the ECS is known to the EATF node 138 as it is the only EATF node that can anchor the ECS of UE-A 108. VoLTE EC signalling will traverse from the Radio and Enhanced Packet Core (EPC) nodes (e.g. eNodeB 112 and S&P GW 116) of the first access network 104 to the P-CSCF node 124, E-CSCF node 134 (or BGCF), EATF node 138, back to E-CSCF node 134 and then toward PSAP 110 directly or via a gateway, for example, an MGCF 128 or IBCF node (not shown). If there is a gateway such as an MGCF 128 or IBCF between IMS network 102 and PSAP 110, the media will pass through a Media Gateway (MGW) if signalling was through the MGCF 128, or the media will pass through a Translation gateway (TrGW) if signalling was sent through an IBCF node (not shown). MGCF 128 is the interconnecting gateway between IMS network 102 and the second access network 106 e.g. GSM/WCDMA or other PSTN/PLMN legacy CS networks. IBCF is the interconnecting gateway between the IMS network 102 and other IP networks e.g. another IMS network or similar.

Referring to FIGS. 1a and 1c, it is assumed that IMS EC setup as shown in FIG. 1b has been completed and that an ECS between UE-A 108 and PSAP 110 is ongoing via the IMS network 102 and first access network 104. The ECS of UE-A 108 originated in the IMS network 102 and has been anchored in the EATF node 138, optionally via MGCF/IBCF. However, as UE-A 108 may move from the first access network 104 to the second access network 106, an EC SRVCC HO decision may be used to initiate an emergency handover in eNodeB 112, which uses MME node 114 to trigger the MSC node 122 of the second access network 106 to begin the handover. The EC SRVCC is initiated by the eNodeB 112 (or EPC) with similar mechanisms as a normal SRVCC (described in 3GPP TS 23.216). The MME node 114 will indicate to the MSC node 122 that a session transfer is for the ECS of UE-A 108 is required, this indication may include the IMEI and/or possibly the Correlation Mobile Subscriber Integrated Services Digital Network Number (C-MSISDN). The MME node 114 only executes SRVCC for emergencies if an emergency voice bearer exists.

The MSC node 122 uses a locally configured emergency-session transfer number-SRVCC (E-STN-SR) for use by the IMS network 102 in performing the handover. The MSC node 122 has one configured E-STN-SR (as there is one logical EATF node 138 per MSC node 122) and sends a session transfer request including the IMEI (as part of sip.instance feature tag) to the IMS network 102 and EATF node 138. For example, the MSC node 122 sends as the session transfer request the SIP message Invite (E-STN-SR, SDP MGW, Contact:+sip.instance="<"IMEI">", PAI: C-MSISDN (if available)). The MSC node 122 could also send the session transfer request using ISUP messaging toward MGCF node 128, e.g. an ISUP IAM message including the IMEI could be sent as specified in 3GPP TS 29.163. In any event, this session transfer request goes through the IMS network 102 via the I-CSCF node 126 and to the EATF node 138. The E-STN-SR in the IMS network 102 can be configured as a Public Service Identity (PSI), and stored in the home subscriber server (HSS) (not shown). The EATF node 138 acts as a routing B2BUA and provides access or session transfer functionality. The EATF node 138 then performs a SDP re-negotiation toward PSAP 110 to change the SDP of UE-A 108 from S&P GW 116 to a SDP received from the MSC node 122 and other subcomponents such as the MGW (not shown). The EATF node 138, P-CSCF node 124 and E-CSCF node 134 from an EC point of view are always located in the serving network.

However, according to the 3GPP standards, only one logical EATF node is defined per network or MSC node 122 or for each PSAP 110. However, in many real deployments, this is not sufficient due to increases in congestion and load within telecommunication networks. The EATF address, an E-STN-SR according to 3GPP TS 23.237 is an E.164 number, is configured on all the MSC nodes 122. This implies that the serving PLMN is assumed to have a single logical EATF. In future telecommunications networks, multiple EATF nodes per network region may be required for meeting future capacity requirements, providing geographic redundancy when EATF nodes in a particular geographic region are overloaded or fail, or when multiple PSAPs are used in the same network such that an EATF node or function is placed close to each PSAP.

As current 3GPP standards define only one single E.164 number for an ECS, this means that current EATF nodes are selected based on normal Domain Name Server (DNS) procedures with no special "intelligence" used to find the correct EATF node. Currently this is usually not an issue because there is only one EATF node used per PSAP or network region. However, with the introduction of multiple EATF nodes per PSAP or network region to alleviate the above future issues, current DNS procedures will not be sufficient to find the correct EATF node anchoring the ECS of a UE and the probability of ending up sending a request to transfer an ECS to the "wrong" EATF node will be high. This may result in call delays or even cut-off of an existing ECS if handover cannot be completed promptly.

A possible solution could be based on picking a certain EATF node in the IMS network at IMS registration and call setup and at handover use a redirect model such that should the wrong EATF node be addressed, then the I-CSCF node either rejects/redirects the ECS to another EATF node until the correct one has been found. Such a model would require additional standardization and a greater level of network node redesign and integration throughout the IMS network. Therefore, there is a need for a reliable scalable solution that enables the correct instance of an EATF node to be found during an ECS transfer given the single locally configured E-STN-SR for the MSC node, while at the same time reducing the requirement to modify existing CSCF nodes in the IMS network.

SUMMARY

It is an object of the present invention to enable an EATF node or multiple EATF nodes in an IMS network to be used in finding an EATF node anchoring an ECS during handover of the ECS from a first access network to a second access network.

According to a first aspect of the present invention there is provided a method of operating a first EATF node. The method comprising receiving a request for transferring an ECS of a UE from a first access network to a second access network, transferring the ECS from the first access network to the second access network when the ECS is known to the first EATF node. The method further comprises selecting a second EATF node from a set of one or more EATF nodes when the ECS is unknown to the first EATF node, and forwarding the request for transferring the ECS to the second EATF node.

Optionally, the method may further comprise determining whether the ECS is known to the first EATF node. Alternatively or additionally, the method may comprise including data representative of the address or identity of the first EATF node in the request for transferring the ECS to the second EATF node.

As an option, the method further comprises the steps of receiving a response from the second EATF node indicating the ECS is unknown to the second EATF node, and selecting a third EATF node from the set of EATF nodes excluding the second EATF node, and forwarding the request for transferring the ECS to the third EATF node. The method may further comprise maintaining a response list of EATF nodes that have indicated to the first EATF node that the ECS is unknown, where the step(s) of selecting further comprises selecting from the set of EATF nodes excluding the EATF nodes in the response list.

Alternatively or in addition to, the method may further comprise the steps of receiving a request for transferring the ECS including data representative of a list of one or more EATF node addresses or identities, selecting the second EATF node from the set of EATF nodes excluding the EATF nodes corresponding to the received list where the ECS is unknown to the first EATF node, and forward, to the second EATF node, the request for transferring the ECS, the list of one or more EATF node addresses including data representative of the address or identity of the first EATF node.

The first EATF node may be located within a first network region including the one or more EATF nodes from the set of EATF nodes and the first EATF node includes a second set of one or more EATF nodes located within a second network region. The method may then further comprise detecting a recovery from a network failure within the first network region, the step(s) of selecting further comprises selecting the second EATF node from the set of EATF nodes and the second set of EATF nodes. As an option, the step(s) of selecting the second EATF node may further comprise selecting the second EATF node from the set of EATF nodes and the second set of EATF nodes for a period of time after detecting the recovery, and on expiry of said period, selecting the second node from only the set of EATF nodes. Alternatively or in addition to, the step(s) of selecting the second EATF node may further comprise selecting the second node from the set of EATF nodes after detecting the recovery, and after receiving responses from the EATF nodes in the set of EATF nodes indicating that the ECS is unknown, selecting another EATF node from the second set of EATF nodes.

As an option, the method may further comprise the step of transmitting, to the network node that sent the transfer request to the first EATF node, a request for removing the first EATF node from the session path of the ECS when the ECS is unknown to the first EATF node.

According to a second aspect of the present invention there is provided an EATF node comprising a receiver, a transmitter, a memory, and a processor, the processor being connected to the receiver, to the transmitter, and to the memory. The receiver is configured to receive a request for transferring an ECS of a UE from a first access network to a second access network. The processor is configured to transfer the ECS of the UE from the first access network to the second access network when the ECS is known to the EATF node. The processor is further configured to select a second EATF node from a set of one or more EATF nodes when the ECS is unknown to the EATF node. The transmitter is configured to forward the request for transferring the ECS to the second EATF node. Optionally, the processor is further configured to determine or detect whether the ECS is known to the EATF node.

The processor may be further configured to include data representative of the address or identity of the EATF node in the request for transferring the ECS. The transmitter may be further configured to forward the request for transferring the ECS including the address of the EATF node to the second EATF node.

The receiver may be further configured to receive a response from the second EATF node indicating the ECS is unknown to the second EATF node, the processor may be further configured to select a third EATF node from the set of EATF nodes excluding the second EATF node, and the transmitter may be further configured to forward the request for transferring the ECS to the third EATF node. The processor may be further configured to maintain a response list of EATF nodes that have indicated to the EATF node that the ECS is unknown, and where the processor may be further configured to select from the set of EATF nodes excluding the EATF nodes in the response list.

Optionally, the receiver may be further configured to receive a request for transferring the ECS including data representative of a list of one or more EATF node addresses or identities. The processor may be further configured to select the second node from the set of EATF nodes excluding the EATF nodes corresponding to the received list of one or more EATF node addresses where the ECS is unknown to the EATF node. The transmitter is further configured to forward, to the second node, the request for transferring the ECS and the list of one or more EATF node addresses including data representative of the address or identity of the EATF node.

The EATF node may be located within a first network region including the one or more EATF nodes from the set of one or more EATF nodes and the EATF node may include a second set of one or more EATF nodes located within a second network region. The processor may be further configured to detect a recovery from a network failure within the first network region, and select the second node from the set of EATF nodes and the second set of EATF nodes. Optionally, the processor may be further configured to select the second EATF node from the set of EATF nodes and the second set of EATF nodes for a period of time after detecting the recovery, and on expiry of said period, select the second EATF node from the set of EATF nodes. The processor may be further configured to select the second EATF node from the set of EATF nodes after detecting the recovery, and after receiving responses from the EATF nodes in the set of EATF nodes indicating to the EATF node that the emergency call is unknown, to select the second EATF node from the second set of EATF nodes.

As an option, the processor and transmitter may be further configured to transmit, to the network node that sent the transfer request to the first EATF node, a request for removing the first EATF node from the session path of the ECS when the ECS is unknown to the first EATF node.

The method, EATF network nodes or apparatus as described herein in which the first access network is a packet switched access network and the second access network is a circuit switched access network.

In this way, an efficient hand over or transfer mechanism for ECSs can be performed when distributing ECS network load over multiple EATF nodes within the same or different network regions or geographic sites, and without requiring other network nodes to maintain knowledge of the EATF nodes anchoring the ECSs.

DETAILED DESCRIPTION

Figure 1A:
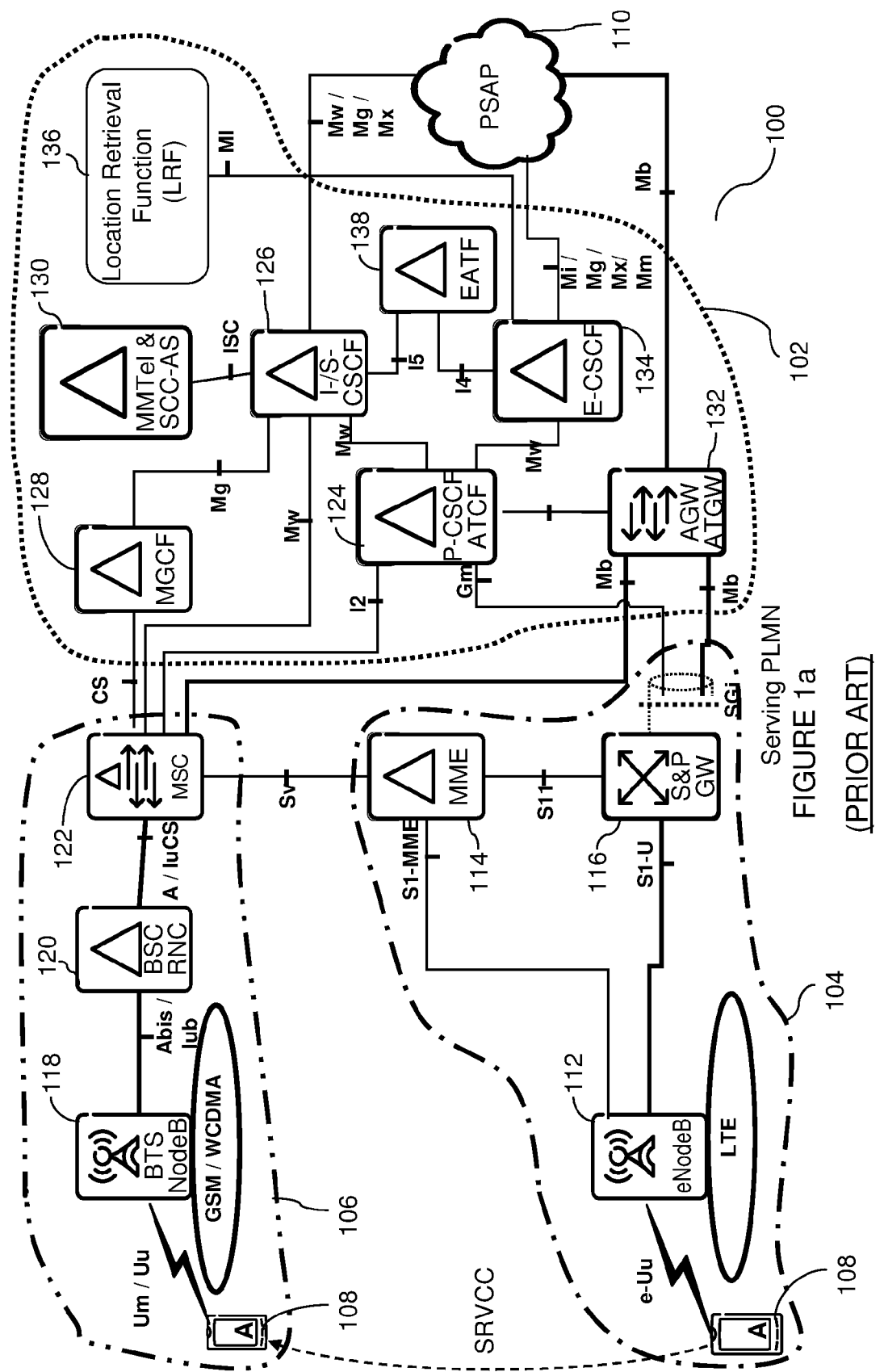
FIG. 1a illustrates schematically a communications network including an IMS network in association with a first and a second access network and a PSAP for implementing IMS emergency services.
Figure 1B:
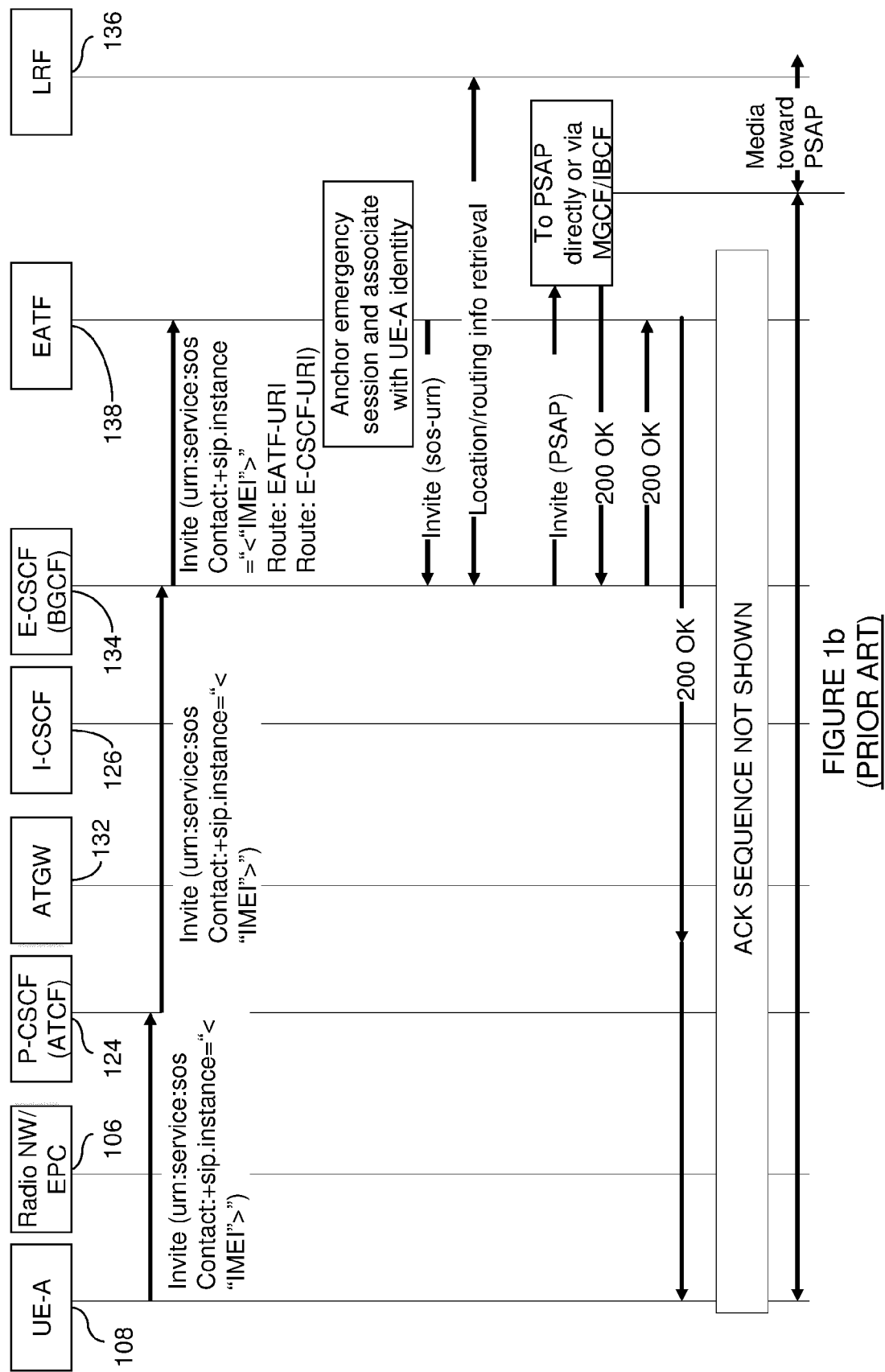
FIG. 1b is a signalling flow diagram illustrating an example IMS EC set-up in the first access network and subsequent ECS.
Figure 1C:
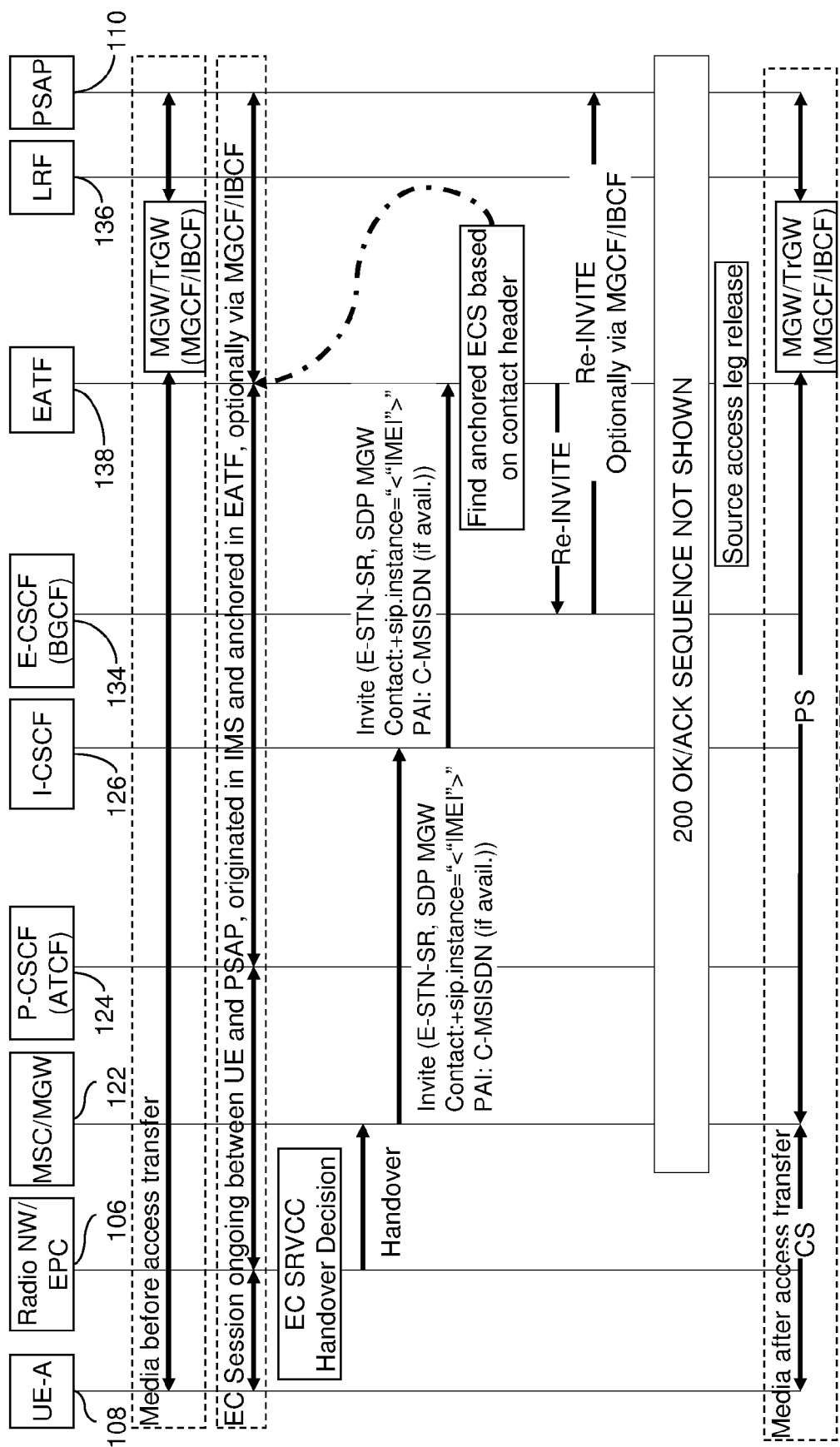
FIG. 1c is a signalling flow diagram illustrating an example IMS emergency session transfer of an ECS from the first access network to the second access network.

In order to overcome the problems identified above there will now be described methods and apparatus for enabling an IMS emergency session transfer of an ECS from a first access network to a second access network in a communications network with multiple EATF nodes. The multiple EATF nodes may be within a certain network regions, geographic regions of a network, or over multiple geographic regions of a network, or over the whole network. The method involves a network node sending a request, to a first EATF node, for transferring the ECS from the first access network to the second access network. The first EATF node either performs the transfer of the ECS from the first network to the second network when the ECS is known to or anchored by the first EATF node, or the first EATF node selects a second EATF node from a set of one or more EATF nodes.

The first EATF node may store the set of one or more EATF nodes in a database or memory or have access to the set of one or more EATF nodes by querying another network node that stores the set of one or more EATF nodes. The set of one or more EATF nodes may include, but is not limited to, data representative of one or more EATF nodes that the first EATF node can communicate with, the EATF node data may be representative of a list of EATF nodes or a list of EATF node identities or addresses or any other data useful for identifying and communicating with the one or more EATF nodes. An EATF node identity or address may comprise or represent any data used to allow other network nodes to communicate with the EATF node either directly or indirectly through other network nodes. Examples of node identities or addresses that may be used in certain examples are data representative for use in identifying and/or addressing an EATF node, lists of DNS addresses, internet protocol addresses, uniform resource numbers (URN), SIP URNs, uniform resource identifiers (URI), SIP URIs.

The first EATF node then forwards the request for transferring the ECS to the second EATF node. Enabling EATF nodes to forward requests for transfer of ECS during handover from a first EATF node to a second EATF node, or subsequent other EATF nodes, to which the ECS may be known or anchored increases the probability that the request for transfer of the ECS will be received by an EATF node anchoring the ECS. Performing these communications only between the multiple EATF nodes minimises delays and congestion within the IMS network by preventing other network nodes to generate multiple requests and receive multiple responses in relation to the request for transfer of the ECS.

In this regard, it has been recognised here that there are a number of ways in which this forwarding mechanism can be achieved amongst multiple EATF nodes. For example, when a first EATF node receives a request for transferring an ECS from the first network to the second network, but the ECS is unknown to or not anchored by the first EATF, then the first EATF may forward the request for transferring the ECS to a second EATF node selected from the set of EATF nodes. Before forwarding the request for transfer to subsequent other EATF nodes within the set of EATF nodes, the first EATF node may wait for a response from the second EATF node indicating the ECS is also unknown to the second EATF node. If no response is received, the first EATF node may assume that the request for transferring the ECS is known to or anchored by the second EATF node and that the second EATF node will handle the transferring of the ECS of the UE from the first access network to the second access network. Alternatively, the first EATF node may forward the request for transferring the ECS to a selected subset of EATF nodes from the set of EATF nodes or to all EATF nodes in the set of EATF nodes in parallel or in a round robin fashion without waiting to receive a response from each of the recipient EATF nodes.

Alternatively or additionally to the above examples, the first EATF node may forward, to the second EATF node, the request for transfer of the ECS including history information such as data representative of the address or identity of the first EATF node. On receiving the request for transfer of the ECS and the data representative of the first EATF node address or identity, and determining that the ECS is unknown to or not anchored by the second EATF node, the second EATF node may select a further EATF node from its own set of one or more EATF nodes (or set of one or more EATF nodes accessible to it) excluding the first EATF node, and forward the request for transfer of the ECS of the UE to the further EATF node including history information comprising data representative of a list of EATF addresses or identities (e.g. the first EATF node's address and the second EATF node's address). The history information is used by a recipient EATF node to determine which further EATF nodes have not received the session transfer request when the ECS of the UE is unknown or not anchored by the recipient EATF node.

Taking this further, alternatively or additionally to the above examples, the first EATF node may receive the request for transfer including history information (e.g. a list of one or more EATF nodes or addresses) such that when the ECS is unknown to or not anchored by the first EATF node, then another EATF node is selected from the set of EATF nodes excluding the EATF nodes on the received list. The first EATF node then forwards, to the selected another EATF node, the request for transfer of the ECS of the UE along with the history information including the received list of EATF nodes and including the first EATF node or its address or identity appended to the list. Circulating history information (e.g. a list of EATF nodes that have already received the request for transfer of the ECS, but which is unknown to or not anchored by the EATF nodes on the list) prevents subsequent EATF nodes forwarding the request for transfer to an EATF node that has already received the request for transfer in which the ECS is unknown or not anchored (unanchored). This minimises the delay in the request for transfer of the ECS being received by the correct EATF node that is anchoring the ECS or which the ECS is known to this EATF node.

If, in the unlikely case, the first EATF node or subsequent EATF nodes have exhausted their set of EATF nodes from which they can select a further EATF node to forward the request for transfer, then a response may be sent to the network node that originally sent the request for transfer to the first or subsequent EATF node, the response would indicate that the ECS is unknown to or not anchored by the first EATF node and/or the subsequent EATF node(s). On receiving the response, the network node originating the request for transfer to the EATF nodes may reject or deny the MSC node's 122 request to handover the ECS from the first access network to the second access network.

Although different signalling messages between network nodes may be used to implement the invention, by way of example only, the SIP request and response messaging will be described. SIP messaging provides the advantages of being flexible when implementing and/or adapting additional network functionality into network nodes within multi-vendor network environments. However, it is to be appreciated that the invention is not limited to using SIP messaging and that other signalling messages between network nodes may be used to implement the invention.

For simplicity, the same reference numerals used in FIG. 1*a* will be reused in the following figures identifying the same or similar network nodes.

Figure 2A:
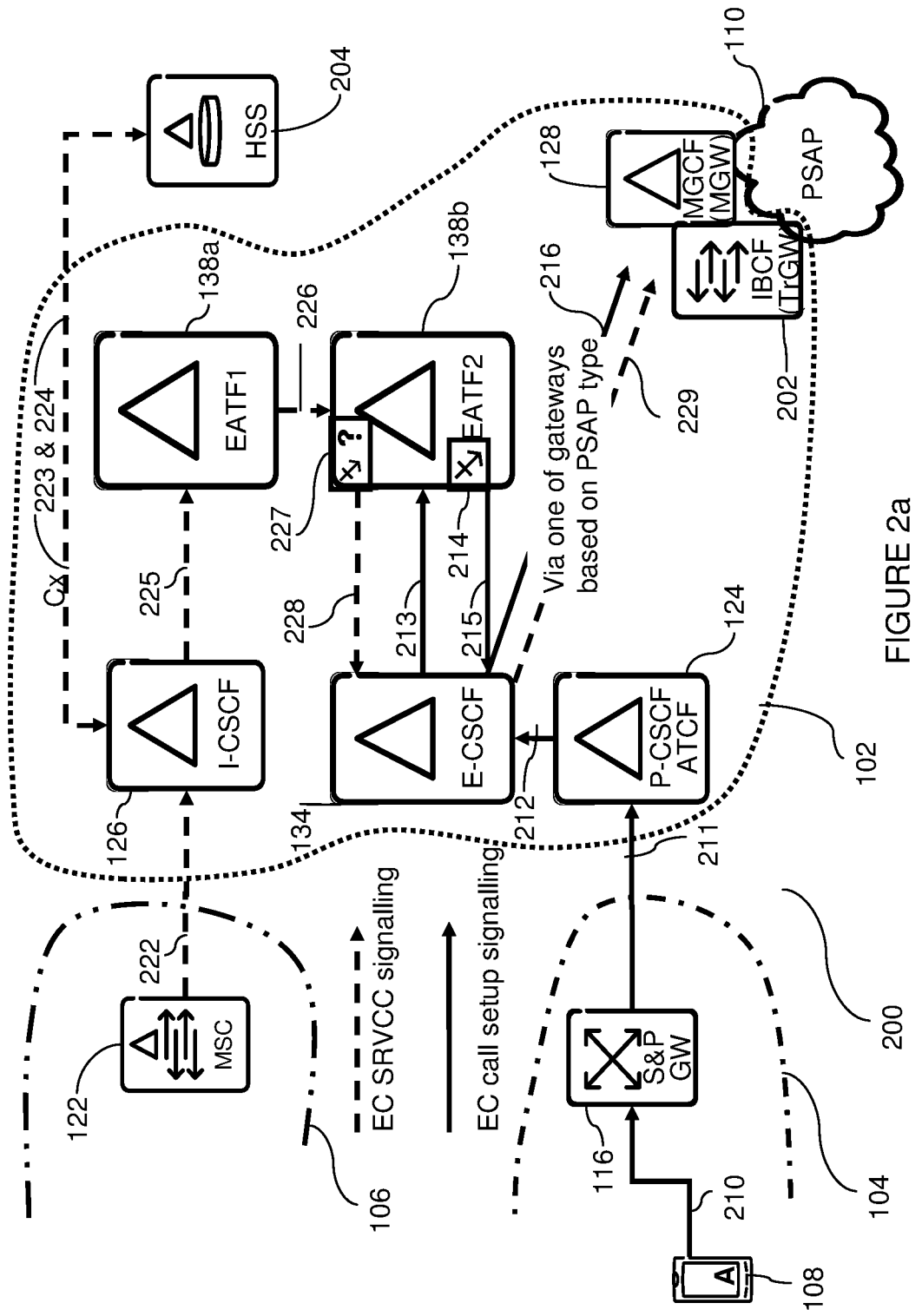
FIG. 2a illustrates schematically an example of a communications network including multiple EATF nodes.

FIG. 2*a* illustrates schematically an example of a solution for enabling a session transfer for an ECS when multiple EATF nodes are present in communications network 200, which includes an IMS network 102, a first access network 104, and a second access network 106. For simplicity, only some of the nodes used for IMS EC setup and EC SRVCC signalling of the first access network 104, second access network 106, and the IMS network 102 are shown. During EC setup, some of the EC setup signalling between the network nodes is illustrated by solid arrows. During handover, some of the handover or EC SRVCC signalling between network nodes is illustrated by the dashed arrows. It is to be appreciated that there may be intermediary network nodes within the signalling paths shown.

In this example there are two EATF nodes, a first EATF node 138*a* and a second EATF node 138*b*. User equipment A (UE-A) (108) is in communication with the first access network 104 and initiates an EC in which the EC set-up and registration signalling (e.g. steps 210 to 213) is routed through the S&P GW 116 of the first access network 104 to the P-CSCF/ATCF node 124, E-CSCF node 134, and to the second EATF node 138b of IMS network 102. In step 214, the ECS is anchored in the second EATF node 138b based on load balancing from P-CSCF node 124 to E-CSCF node 134 and/or the second EATF node 138b. The second EATF node 138b is used for anchoring an ECS between the UE-A 108 within the first access network 104 and the PSAP 110. Once the ECS of UE-A 108 is anchored in the second EATF node 138b, then the ECS between UE-A 108 and the PSAP 110 is set up (via steps 215 and 216) directly, or indirectly via one of the gateways IBCF node 202 or MGCF node 128, During the ECS, UE-A 108 may move or be within range of the second access network 106 such that the first access network 104 may deem that a handover of the ECS of UE-A 108 to the second access network 106 is necessary. The first access network 104 issues an emergency SRVCC HO request (not shown) to the MSC node 122 of the second access network 106 (typically via an MME node (not shown)). In step 222, the MSC node 122 sends, in response to the E-SRVCC HO request, a session transfer request (also known as a request for transfer of the ECS or a handover request for the ECS) to I-CSCF node 126 in the IMS network 102, as UE-A 108 is an IMS subscriber. In steps 223 and 224, I-CSCF node 126 performs a location information request (LIR) query with a HSS 204 to retrieve an address of a possible EATF node that may be anchoring the ECS. The session transfer request includes the E-STN-SR (locally configured at the MSC node 122) as calling party identity in relation to the ECS. The I-CSCF node 126 can use the E-STN-SR as a key when performing the LIR query to the HSS 204 as the E-STN-SR is an IMS PSI. The I-CSCF receives an address to an EATF node, which could either be an IP address or a Fully Qualified Domain Name. In the latter case, DNS look-up procedures are performed to identify at least one of the two EATF nodes 138a and 138b that may be anchoring the ECS of UE-A 108. The I-CSCF node 126 or the HSS 204 may select one of many EATF nodes that are in the local site (this is usually done on a random or round robin basis). In this example, the first EATF node 138a is selected.

In step 225, the I-CSCF node 126 sends the first EATF node 138a the session transfer request in relation to the ECS of UE-A 108. The first EATF node 138a is configured to determine whether UE-A 108 and/or the ECS are known or anchored at the first EATF node 138a. If the first EATF node 138a determines that it is not the anchoring EATF node in relation to the ECS of UE-A 108, then the first EATF node 138a is further configured, in step 226, to select an EATF node from a set of one or more EATF node(s) and forward the session transfer request to the selected EATF node. In this example, the second EATF node 138b is selected. In order to do this, the set of one or more EATF nodes at the first EATF node 138a may include the first EATF node 138a having access to DNS or local IP address lists containing the addresses of the EATF nodes in the set of one or more EATF nodes, including the second EATF node 138b and other subsequent EATF nodes (not shown) in the network 200. Alternatively, the set of one or more EATF nodes may be stored in a database or memory of the first EATF node 138a. In any event, the first EATF node 138a can be configured to select and forward the session transfer message onwards to another EATF node, in this example, the second EATF node 138b.

In step 227, the second EATF node 138b receives and determines that the ECS of UE-A 108 associated with the session transfer message is anchored with the second EATF node 138b. Once notified, the second EATF node 128b proceeds to perform the session transfer or handover procedure (steps 228 to 229) from the first access network 104 to the second access network 106 such that the ECS between UE-A 108 and PSAP 110 continues via the second access network 106.

It is to be appreciated that the session transfer message may be sent to the next EATF node in the set of EATF nodes (e.g. the next EATF node in a list of EATF node addresses or identities). Alternatively or additionally, the session transfer message may be forked (i.e. sent in parallel) to other EATF nodes in the set of EATF nodes or list of EATF node addresses or identities. Additionally, to avoid loops or subsequent EATF nodes dispatching the session transfer message to EATF nodes that have already received the session transfer message, an indication about "visited" EATF nodes or EATF nodes that have received the session transfer message can be used to notify the next or subsequent EATF node receiving the session transfer message of other EATF nodes that have already received the session transfer message. Should the first or subsequent EATF node receiving the session transfer message associated with the ECS be unable to forward the session transfer message to another EATF node when the ECS of UE-A 108 is unknown to or not anchored by the first or subsequent EATF node, then this EATF node may send a rejection message (e.g. 480 message according to 3GPP TS 24.237) back to the I-CSCF node 126 or other network node that originally sent the session transfer message to the first or subsequent EATF node(s).

Figure 2B:
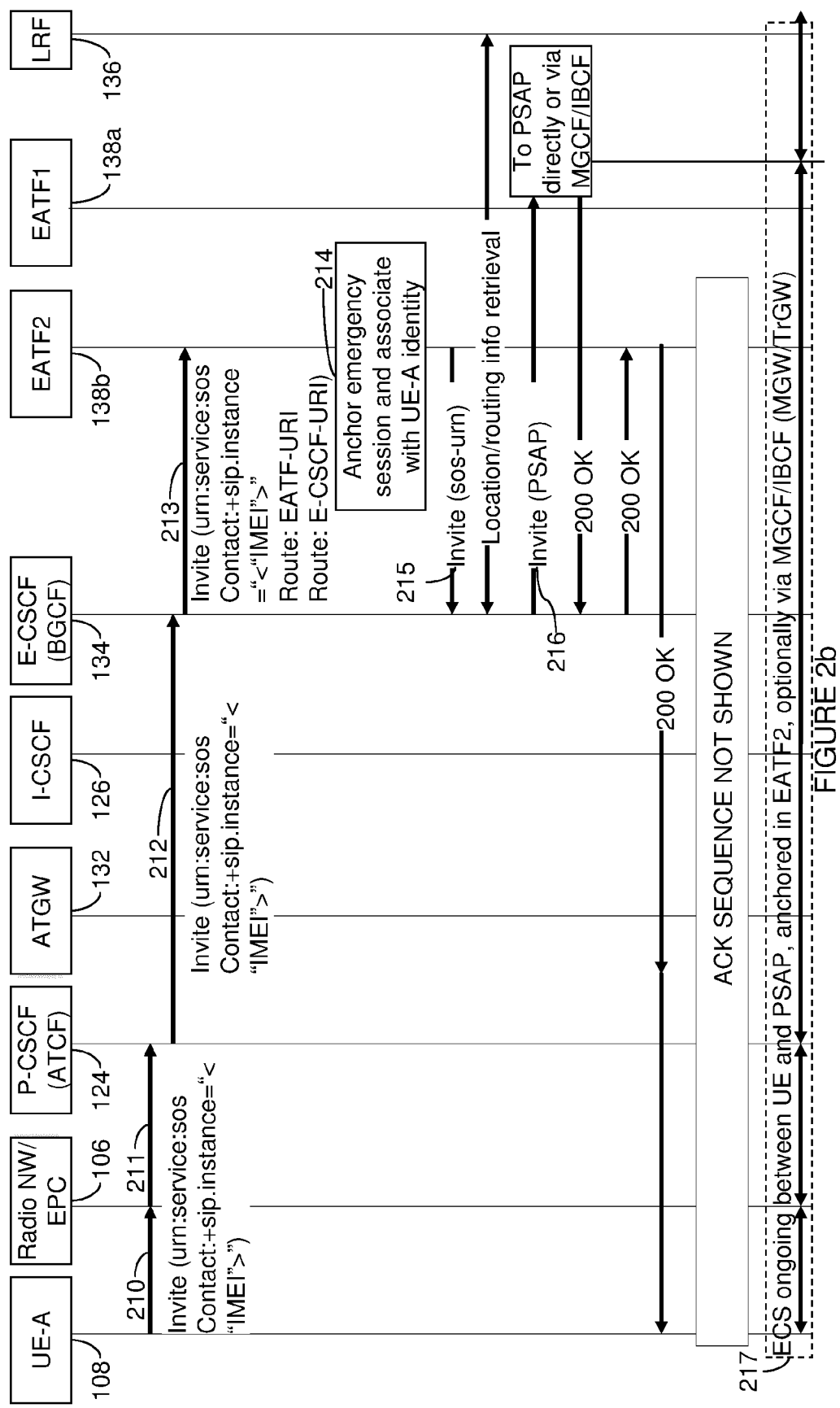
FIG. 2b is a signalling flow diagram illustrating IMS EC set-up and a subsequent ECS communications in the communications network with multiple EATF nodes.

Referring now to FIGS. 2a and 2b, which illustrate a schematic and a call flow diagram of an example EC set-up when multiple EATF nodes are present, in step 210 an EC is initiated by UE-A 108 when UE-A 108 sends a SIP Invite request message including the IMEI of UE-A 108 to the first access network 104, e.g. Invite (urn:service:sos; Contact:+sip.instance="<"IMEI">"). This is received by the S&P GW node 116. In step 211, S&P GW node 116 forwards the SIP Invite message to set up an ECS to the P-CSCF node 124 in the IMS network 102. On receiving the SIP Invite from the S&P GW node 116, the P-CSCF node 124 uses DNS queries to select an E-CSCF node and additionally an EATF node for use in anchoring an ECS for UE-A 108. In this case, the E-CSCF node 134 and the second EATF node 138b are selected by P-CSCF node 124. Load-balancing may be used when multiple E-CSCF/EATF nodes are present during the selection of the E-CSCF/EATF node(s). In step 212, the P-CSCF node 124 forwards the SIP Invite to E-CSCF node 134.

In step 213, the E-CSCF node 134 sends a SIP Invite message to the second EATF node 138b, the SIP Invite message also includes the IMEI and the address of the second EATF node 138b, e.g. Invite (urn:service:sos; Contact: +sip.instance="<"IMEI">"; Route: EATF-URI; Route: E-CSCF-URI). In step 214, an ECS associated with UE-A 108 is anchored in the second EATF node 138b using IMEI as a unique key that is present in both the initial ECS request from the UE (step 213) and the session transfer request from the MSC node 122 (step 227), and can then be used to correlate the two sessions.

In steps 215 and 216, the ECS is then set up by the second EATF node 138b when it sends an Invite (sos-urn) message to the E-CSCF node 134 in step 215. In step 216, the E-CSCF node 134 responds after performing a Location/routing information retrieval query with the LRF to determine the location of PSAP 110, by setting up the ECS of UE-A 108 with the PSAP 110 directly, or indirectly via the IBCF node 202 or MGCF node 128. This is performed by the E-CSCF node 134 sending the SIP request message, Invite (PSAP), to the PSAP 110. The remaining steps and call flow signaling of FIG. 2b follow a normal EC setup procedure in which the ECS is set up between the UE-A 108 and PSAP 110 with appropriate acknowledgements (200 OK) being sent, where necessary, to the network nodes involved in the procedure. In step 217, an ongoing ECS between the UE-A 108 and PSAP 110 ensues with the ECS anchored in the second EATF node 138b, the ECS may be directly connected to the PSAP 110 or routed via gateways such as the MGCF node 128 or the IBCF node 202.

Figure 2C:
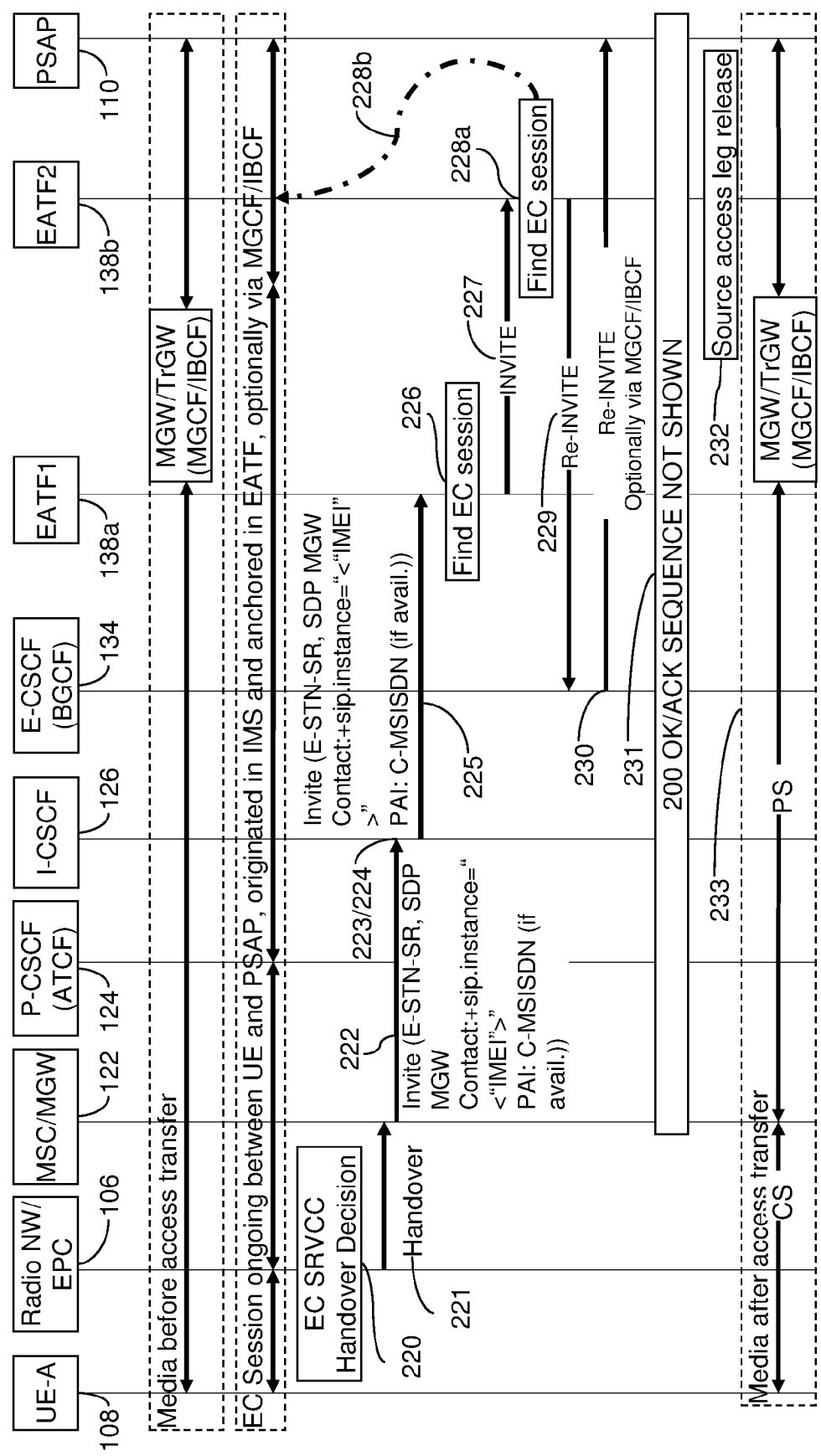
FIG. 2c is a signalling flow diagram illustrating a solution for enabling an IMS emergency session transfer of an ECS when multiple EATF nodes are present.

Referring now to FIGS. 2a and 2c, which illustrate a schematic and a call flow diagram of an example of a solution for enabling a session transfer of an ECS with multiple EATF nodes, in step 220 the first access network 104 initiates an EC SRVCC handover decision in relation to the ongoing ECS between UE-A 108 and PSAP 110. There are many reasons for performing a handover, some of which may be due to UE-A 108 moving into range of the second access network 106, due to congestion in the first access network 104, or due to losing LTE/LTE Advanced coverage. In any event, the first access network 104 triggers an emergency SRVCC handover. In step 221, the first access network 104 indicates to the MSC node 122 of the second access network 106 that a handover of an ECS associated with UE-A 108 is required (e.g. by sending an emergency SRVCC handover request via the MME node (not shown)).

In step 222, after receiving the handover indication from the first access network 104, the MSC node 122 initiates handover or transfer of the ECS from the first access network 104 to the second access network 106 by sending to the I-CSCF node 126 of IMS network 102a a session transfer request for the ECS including the IMEI of UE-A 108 and a locally configured E-STN-SR. The session transfer request may take the form of a SIP Invite request, e.g. Invite (E-STN-SR, SDP MGW; Contact:+sip.instance="<"IMEI">"; PAI: C-MSISDN (if available)). In steps 223 and 224 (shown more clearly in FIG. 2a), the I-CSCF node 126, on receiving the session transfer request, uses the received E-STN-SR and performs an LRI query with the HSS 204 via Diameter Cx interface. The I-CSCF node 126 then, using load-balancing, selects an EATF node from the responses from the HSS 204. Alternatively, the I-CSCF node 126 merely uses any of the one or more EATF node address(es) or identities received from its query with HSS 204. Alternatively, the I-CSCF node 126 may select an EATF node based on normal DNS procedures, but when multiple EATF nodes are used within the network or site then this may mean the I-CSCF node 126 does not identify the EATF node that anchors the ECS of UE-A 108. In this example, the I-CSCF node 126 selects and uses the address of the first EATF node 138a, and, in step 225, sends the session transfer request (e.g. Invite (E-STN-SR, SDP MGW; Contact:+sip.instance="<"IMEI">"; PAI: C-MSISDN (if available))) to the first EATF node 138a.

In step 226, on receiving the session transfer request in relation to the ECS of UE-A 108, the first EATF node 138a will attempt to find the ECS of UE-A 108 (i.e. look for the anchored ECS) using the IMEI or even the C-MSISDN (if available) that it received in the session transfer request. If the first EATF node 138a determines in step 226 that the ECS of UE-A 108 is not anchored or is unknown to the first EATF node 138a, then the first EATF node selects an EATF node from a set of one or more EATF nodes (e.g. using DNS address list or locally configured address list) to forward the session transfer request. In this example, it selects the second EATF node 138b. In step 227, the first EATF node 138a forwards the session transfer request to the second EATF node 138b (e.g. Invite (E-STN-SR, SDP MGW; Contact:+ sip.instance="<"IMEI">"; PAI: C-MSISDN (if available))).

In step 228a, on receiving the session transfer request in relation to the ECS of UE-A 108 from the first EATF node 138a, the second EATF node 138b will attempt to find the ECS of UE-A 108 (i.e. look for the anchored ECS) using the IMEI or even the C-MSISDN (if available) that it received in the session transfer request. As the ECS has been anchored at the second EATF node 138b, in step 228b the second EATF node 138b finds the anchored ECS of UE-A 108 and proceeds to transfer the ECS of UE-A 108 from the first access network 104 to the second access network 106.

This involves notifying the PSAP 110 via E-CSCF node 134 that UE-A 108 will be communicating with the PSAP 110 via the second access network 106 (see steps 229 to 231), and in step 232 releasing the ECS source access legs associated with the first access network 104 once the new ECS access legs associated with the second access network 106 have been established between UE-A 108 and PSAP 110. In particular, in step 229, the second EATF node 138b sends a Re-Invite request message to E-CSCF node 134 (this is a message notifying the E-CSCF node 134 that UE-A 108 has changed access networks and so a re-INVITE is necessary to inform the E-CSCF node 134 of the new Contact and SDP details).

In step 230, the E-CSCF node 134 also forwards the re-Invite request message to the PSAP 110 directly or optionally via the MGCF node 128 or IBCF node 202. In step 231, the various nodes of the first access, second access, and/or IMS networks 104, 106 or 102 send acknowledgement messages (e.g. a sequence of 200 OK ACK messages) indicating a successful handover of the ECS of UE-A 108 from the first access network 104 to the second access network 106. In step 232, the second EATF node 138b releases the source access legs associated with the first access network 104 as these are not required anymore. In step 233, the ECS has been transferred from the first access network 104 to the second access network 106 such that the UE-A 108 communicates with PSAP 110 via MSC node 122 via an MGCF (MGW) node 128 or IBCF (TrGW) node 202.

It is to be appreciated that the first EATF node 138a may also include history information (History-info) including its own identity to enable the second EATF node 138b (and other EATF nodes (not shown)) to determine other EATF nodes that have not yet received the session transfer request. This can help prevent the session transfer request from looping between EATF nodes(s). It is also to be appreciated that the first EATF node 138a may also fork the session transfer request to all other EATF nodes in its set of EATF nodes, which can reduce the delay in finding the EATF node that is anchoring the ECS of UE-A 108. However, until the EATF node anchoring the ECS of UE-A is found, the procedure of selecting and forwarding the session transfer message will continue from the first EATF node or subsequent EATF nodes. If it is determined that no EATF node is anchoring the ECS of UE-A 108, then the call is rejected back to I-CSCF node 126 with a 480 SIP response message.

Figure 3A:
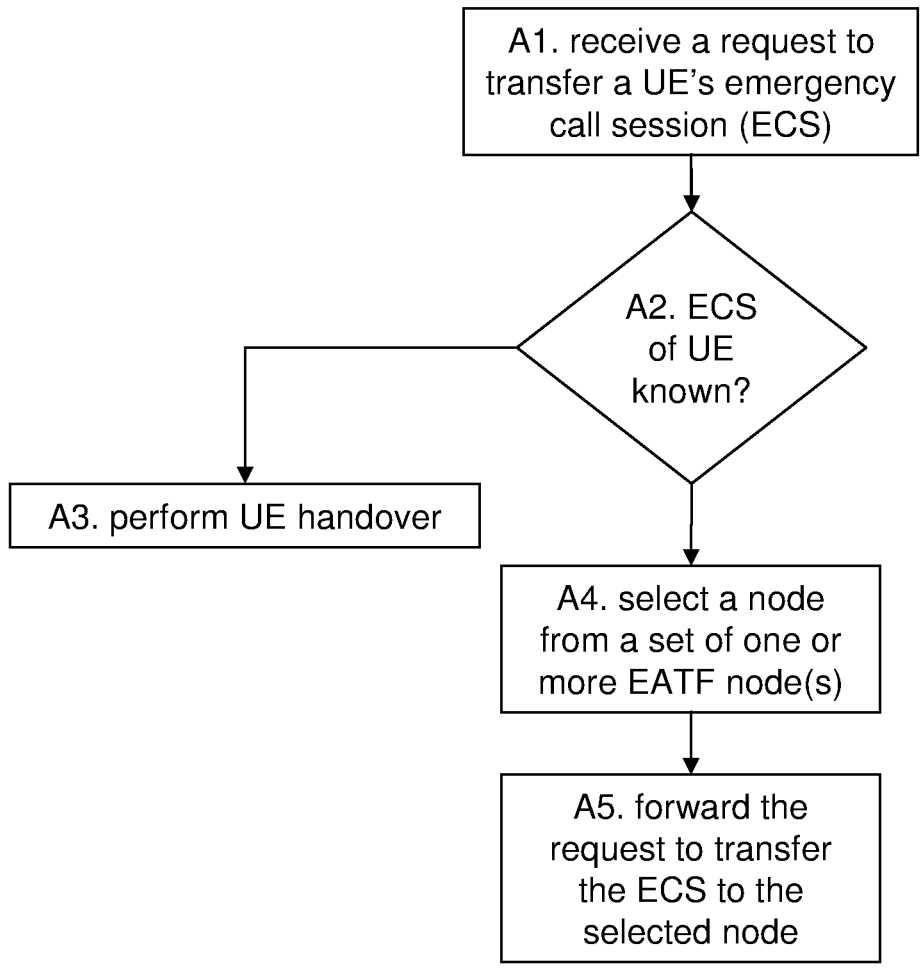
FIG. 3a is a flow diagram illustrating a solution for enabling an IMS emergency session transfer of an ECS when multiple EATF nodes are present.

FIG. 3a is a flow diagram illustrating an example process of a solution performed at a first EATF node, or a first network node with the functionality of an EATF node, for enabling an IMS emergency session transfer of an ECS when multiple EATF nodes are present. The steps performed include:

A1. Receiving, at the first EATF node, a request for transferring an ECS of a UE from a first access network to a second access network. The request for transferring an ECS of the UE may be sent from another network node (e.g. an I-CSCF node 126). Alternatively, the request for transferring an ECS of the UE may be sent from another EATF node.

A2. Determining whether the ECS of the UE is known to or is anchored by the first EATF node. If the ECS is known or is anchored by the first EATF node, then the process proceeds to step A3. If the ECS is unknown or is not anchored by the EATF node, then the process proceeds to step A4.

A3. Transferring the ECS from the first access network to the second access network when the ECS is known or anchored by the first EATF node.

A4. Selecting a second EATF node from a set of one or more EATF nodes when the ECS is unknown to the first EATF node. Proceed to step A5.

A5. Forwarding the request for transferring the ECS of the UE to the second EATF node.

Figure 3B:
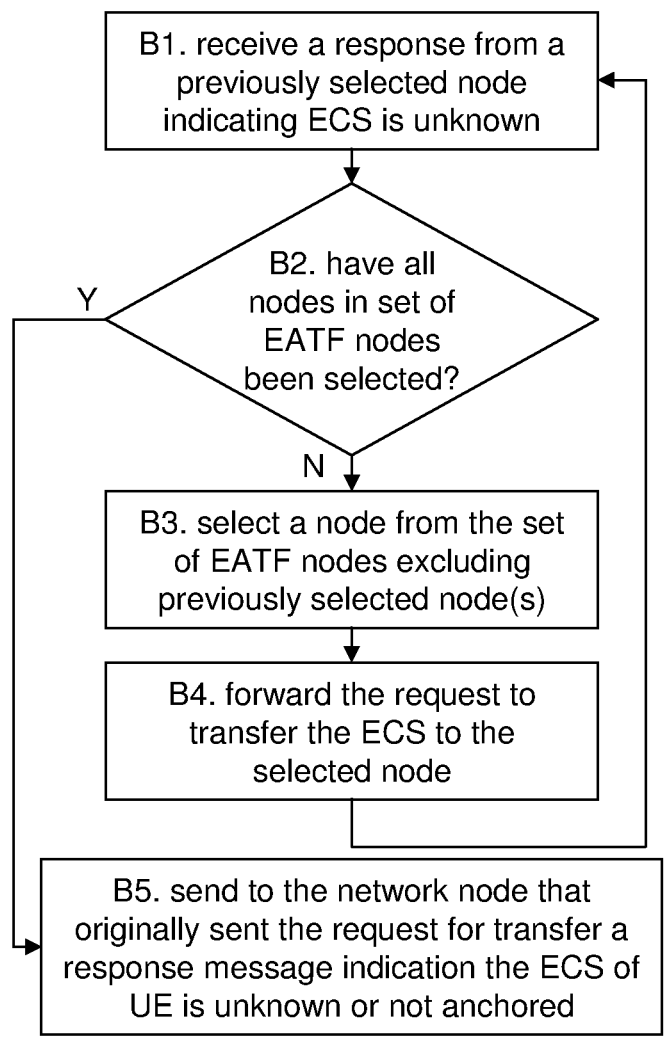
FIG. 3b is a flow diagram illustrating an example of a solution for enabling an IMS emergency session transfer of an ECS when multiple EATF nodes are present.

FIG. 3b is another flow diagram illustrating an example solution of a further process performed the first EATF node, or the first network node with the functionality of an EATF node, for enabling an IMS emergency session transfer of an ECS when multiple EATF nodes are present. In addition to steps A1 to A5 of FIG. 3a, further steps that may be performed at the first EATF node include:

B1. Receiving a response from the second EATF node indicating the ECS is unknown to the second EATF node.

B2. Determining whether all of the EATF nodes in the set of EATF nodes have been selected. If all of the EATF nodes in the set of EATF nodes have been previously selected for forwarding the request for transfer, then the process proceeds to step B5. Otherwise, the process proceeds to the selection step B3. For use in determining whether all of the EATF nodes in the set of EATF nodes have been selected, the first EATF node may maintain a response list of EATF nodes that have indicated to the first EATF node that the ECS is unknown or is not anchored by those EATF nodes. In step B3, the step of selecting further EATF nodes may include selecting from the set of EATF nodes excluding the EATF nodes on the response list.

B3. Selecting a third EATF node from the set of EATF nodes excluding the second network node. The step of selecting further EATF nodes may include selecting from the set of EATF nodes excluding the EATF nodes on the response list derived from step B2. It should be apparent that on receiving further responses from the third and subsequent EATF nodes that the ECS of the UE is unknown or not anchored by these EATF nodes, then the step of selecting includes selecting another EATF node from the set of EATF network nodes excluding the previously selected EATF node(s) (these may include the second, third, and or subsequent other EATF nodes).

B4. Forwarding the request for transferring the ECS to the third EATF node or subsequently selected EATF nodes. The process may proceed to step B1.

B5. Sending a response message to the network node that originally sent the request for transfer to the first EATF node, the response message indicating that the ECS of the UE is unknown or not anchored by the first EATF node. This message may further include a reject indication for rejecting the session transfer of the ECS of the UE.

Figure 3C:
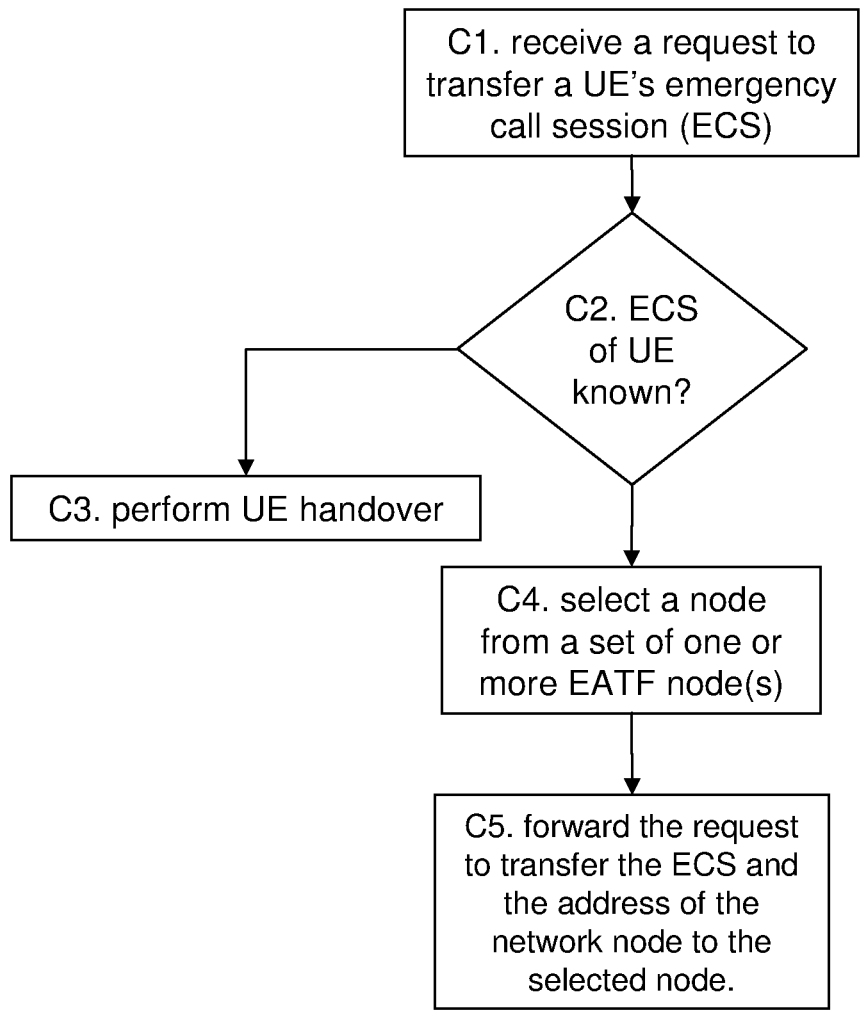
FIG. 3c is a flow diagram illustrating an example of a solution for enabling an IMS emergency session transfer of an ECS when multiple EATF nodes are present.

FIG. 3c is another flow diagram illustrating an example solution of a process performed at a first EATF node, or a first network node with the functionality of an EATF node, for enabling an IMS emergency session transfer of an ECS when multiple EATF nodes are present. Instead of forwarding the request for transfer of an ECS of the UE to each selected EATF node, the request is forwarded to a selected EATF node including the address of the first EATF node. The steps performed at the first EATF node may include:

C1. Receiving, at the first EATF node, a request for transferring an ECS of a UE from a first access network to a second access network. The request for transferring an ECS of the UE may be sent from another network node (e.g. I-CSCF node 126). Alternatively, the request for transferring an ECS of the UE may be sent from another EATF node.

C2. Determining whether the ECS of the UE is known to or anchored by the first EATF node. If the ECS is known or is anchored by the first EATF node, then the process proceeds to step C3. If the ECS is unknown or is not anchored by the first EATF node, then the process proceeds to step C4.

C3. Transferring the ECS from the first access network to the second access network when the ECS is known to or anchored by the first EATF node.

C4. Selecting a second EATF node from a set of one or more EATF nodes when the ECS is unknown to the first EATF node. Proceed to step C5.

C5. Forwarding the request for transferring the ECS of the UE to the second EATF node, where the request for transferring the ECS further includes the address or identity of the first EATF node.

Figure 3D:
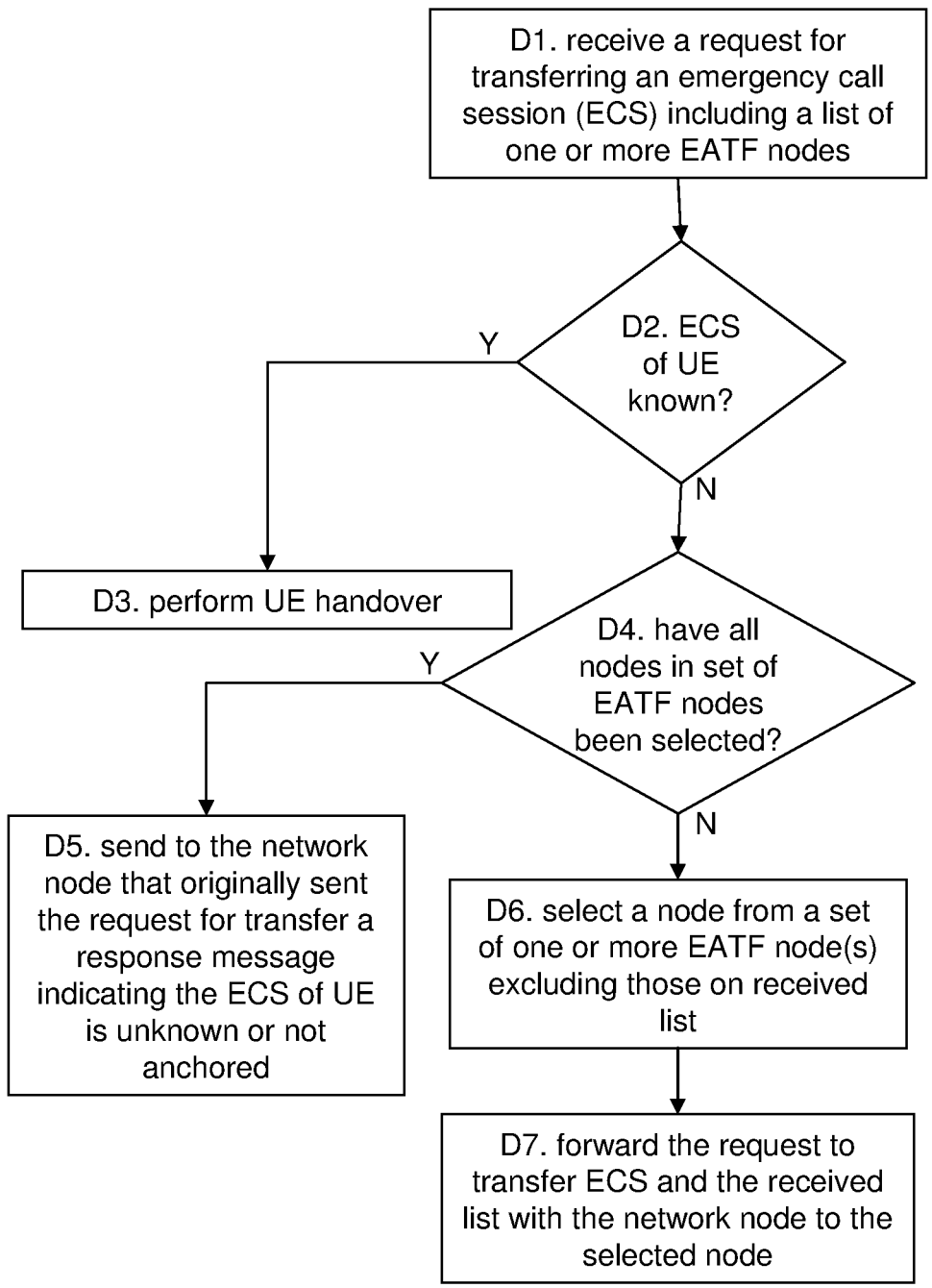
FIG. 3d is a flow diagram illustrating an example of a solution for enabling an IMS emergency session transfer of an ECS when multiple EATF nodes are present.

FIG. 3d is another flow diagram illustrating an example solution of a process performed at the first EATF node, or a first network node with the functionality of an EATF node, for enabling an IMS emergency session transfer of an ECS when multiple EATF nodes are present. Similarly to the steps performed in FIG. 3c, the first EATF node may instead receive a history of EATF nodes that have already been visited. The history of EATF nodes may be in the form of a list of EATF node identifiers, identities or addresses, which is used by the first EATF node for selecting another EATF node that has not already been visited. The steps performed at the first EATF node may include:

D1. Receiving a request for transferring the ECS of the UE including a list of one of more EATF node addresses or identities;

D2. Determining whether the ECS of the UE is known to or is anchored by the first EATF node. If the ECS is known or is anchored by the first EATF node, then the process proceeds to step D3. If the ECS is unknown or is not anchored by the first EATF node, then the process proceeds to step D4.

D3. Transferring the ECS from the first access network to the second access network when the ECS is known to or anchored by the first EATF node.

D4. Determining whether all of the EATF nodes in a set of one or more EATF nodes have been previously selected. This is performed by excluding the EATF nodes corresponding to the list of one or more EATF node addresses from the set of EATF nodes. If this results in an empty set or a null set, then all the EATF nodes in the set of EATF nodes have been previously selected or visited. If all the EATF nodes in the set of EATF nodes have been previously selected or visited for forwarding the request for transfer, then the process proceeds to step D5. Otherwise, the process proceeds to the selection step D6.

D5. Sending a response message, to the network node (e.g. an I-CSCF 126 or even a previous EATF node) that originally sent the request for transfer, indicating that the ECS of the UE is unknown or not anchored by the first EATF node. The response message may further include an indication to reject the session transfer of the ECS of the UE.

D6. Selecting the second EATF node from the set of EATF nodes but excluding the EATF nodes corresponding to the received list of EATF node addresses where the ECS is unknown or not anchored by the first EATF node. Proceed to D7.

D7. Forwarding, to the second EATF node, the request for transferring the ECS of the UE, and including the received list of EATF node addresses including the address or identity of the first EATF node.

Figure 4A:
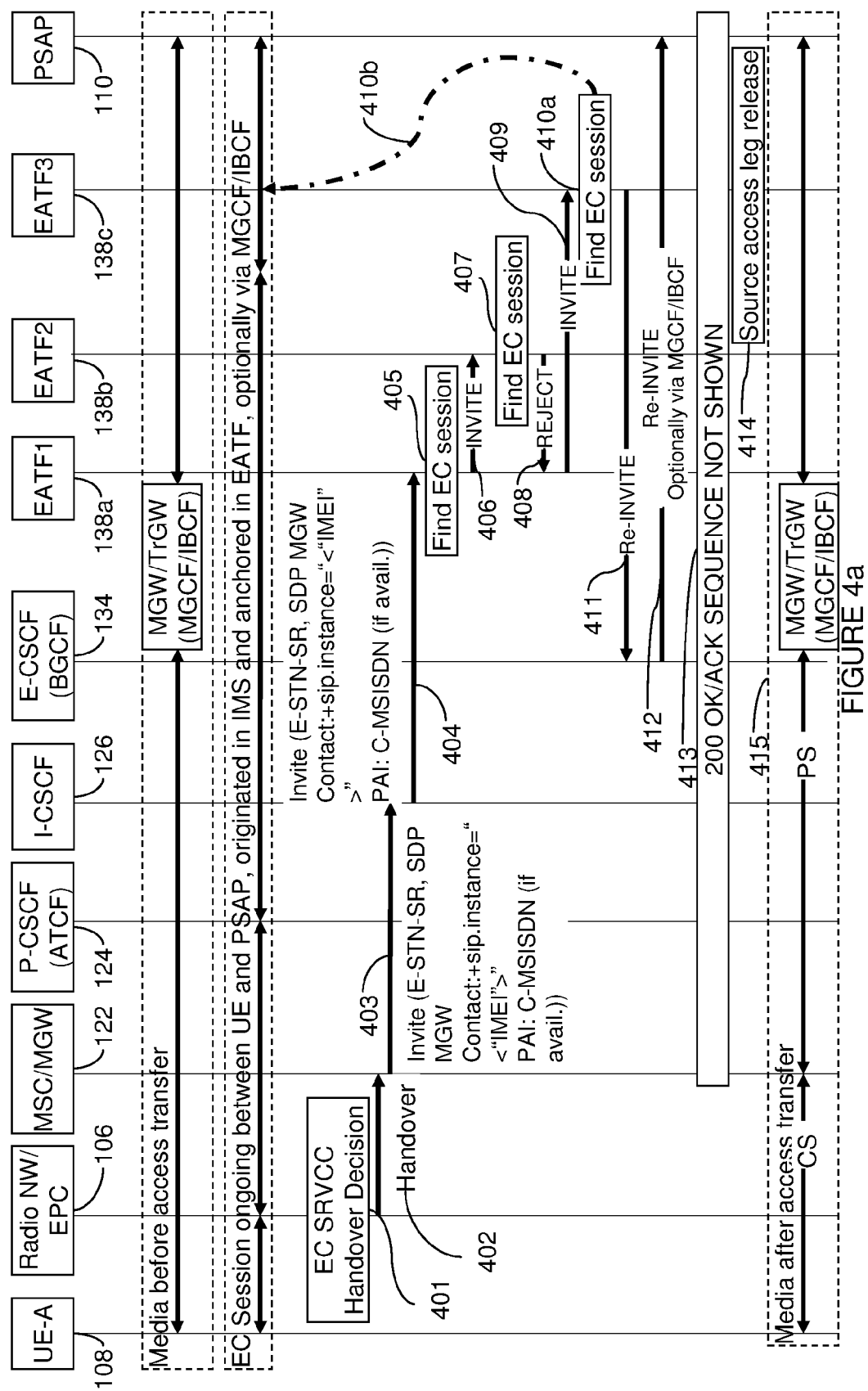
FIG. 4a is a signalling flow diagram illustrating an example of another solution for enabling an IMS emergency session transfer of an ECS when multiple EATF nodes are present.

FIG. 4a is a signal flow illustrating an example of a solution for enabling a session transfer of an ECS with multiple EATF nodes. It is assumed in this example that the ECS of UE-A 108 has been anchored at a third EATF node 138c (EATF3). In step 401, the first access network 104 initiates an EC SRVCC handover decision in relation to the ongoing ECS between UE-A 108 and PSAP 110. In step 402, the first access network 104 indicates to the MSC node 122 of the second access network 106 that a handover of an ECS associated with UE-A 108 is required (e.g. by sending an emergency SRVCC handover request via an MME node (not shown)).

In step 403, after receiving the handover indication from the first access network 104, the MSC node 122 initiates handover or transfer of the ECS from the first access network 104 to the second access network 106 by sending to the I-CSCF node 126 of IMS network 102 a session transfer request for the ECS including the IMEI of UE-A 108 and a locally configured E-STN-SR. The session transfer request may be in form of a SIP Invite request, e.g. Invite (E-STN-SR, SDP MGW; Contact: +sip.instance="<"IMEI">"; PAI: C-MSISDN (if available)). The I-CSCF node 126, on receiving the session transfer request, uses the received E-STN-SR and performs an LIR query with the HSS 204 via Diameter Cx interface. The I-CSCF node 126 then, using load-balancing, selects an EATF node from the responses received from the HSS 204. The I-CSCF receives an address to an EATF node, which could either be an IP address or a Fully Qualified Domain Name. In the latter case, DNS look-up procedures are performed to identify at least one of the EATF nodes. Alternatively, the I-CSCF node 126 merely uses any of the one or more addresses or identities of EATF nodes received from its query with HSS 204. Alternatively, the I-CSCF node 126 may select an EATF node based on normal DNS procedures, but when multiple EATF nodes are used within the network or site then this may mean the I-CSCF node 126 does not identify the EATF node that actually anchors the ECS of UE-A 108. In this example, the I-CSCF node 126 selects and uses the address of the first EATF node 138a (e.g. EATF1).

In step 404, the I-CSCF node 126 sends the session transfer request (e.g. Invite (E-STN-SR, SDP MGW; Contact:+sip.instance="<"IMEI">"; PAI: C-MSISDN (if available))) to the first EATF node 138a. In step 405, on receiving the session transfer request in relation to the ECS of UE-A 108, the first EATF node 138a will attempt to find the ECS of UE-A 108 (i.e. look for the anchored ECS) using the IMEI or even the C-MSISDN (if available) that it received in the session transfer request from the I-CSCF node 126. If the first EATF node 138a determines in step 405 that the ECS of UE-A 108 is not anchored or is unknown by the first EATF node 138a, then the first EATF node selects another EATF node from a set of EATF nodes (e.g. the set may include a second EATF node 138b (e.g. EATF2) and a third EATF node 138c (e.g. EATF3)). The set of one or more EATF nodes may be derived using DNS address lists or a locally configured address list. The session transfer request will then be forwarded to the selected EATF node. In this example, the first EATF node 138a selects the second EATF node 138b. In step 406, the first EATF node 138a forwards the session transfer request to the second EATF node 138b using a SIP INVITE message (e.g. Invite (E-STN-SR, SDP MGW; Contact:+sip.instance="<"IMEI">"; PAI: C-MSISDN (if available))).

In step 407, on receiving the session transfer request in relation to the ECS of UE-A 108 from the first EATF node 138a, the second EATF node 138b will attempt to find the ECS of UE-A 108 (i.e. look for the anchored ECS) using the IMEI or even the C-MSISDN (if available) that it received in the session transfer request. As the ECS has not been anchored at the second EATF node 138b either, the second EATF node 138b in step 408, sends a response message (e.g. a reject message or a "final" negative SIP response message, or a SIP message with a "4xx" response) for indicating to the first EATF node 138a that the ECS is unknown or is not anchored by the second EATF node 138b.

On receiving the response message from the second EATF node indicating that the ECS is unknown or not anchored by the second EATF node 138b, the first network node 138a performs another selection of an EATF node from the set of EATF nodes excluding the second EATF node 138b. The first EATF node selects the third EATF node 138c. In step 409, the first EATF node 138a forwards the session transfer request to the third EATF node 138b using SIP INVITE message (e.g. Invite (E-STN-SR, SDP MGW; Contact:+sip.instance="<"IMEI">"; PAI: C-MSISDN (if available))).

In step 410a, on receiving the session transfer request from the first EATF node 138a, the third EATF node 138c attempts to find the ECS of UE-A (i.e. look for the anchored ECS) using the IMEI or even the C-MSISDN (if available) that it received in the session transfer request. In this case, since the ECS of UE-A 108 is anchored at the third EATF node 138c, the third EATF node 138c in step 410b finds the anchored ECS of UE-A 108 and proceeds to transfer the ECS of UE-A 108 from the first access network 104 to the second access network 106.

This involves notifying the PSAP 110 via the E-CSCF node 134 that UE-A 108 will be communicating with the PSAP 110 via the second access network 106 (see steps 411 to 413), and in step 414 releasing the ECS source access legs associated with the first access network 104 once the new ECS access legs associated with the second access network 106 have been established between UE-A 108 and PSAP 110.

In particular, in step 411, the third EATF node 138c sends a Re-Invite request message to E-CSCF node 134 (this is a message notifying the E-CSCF node 134 that UE-A 108 has changed access networks and so a re-INVITE is necessary to inform the E-CSCF 134 of the new Contact and SDP details). In step 412, the E-CSCF node 134 also forwards the re-Invite request message to the PSAP 110 directly or optionally via the MGCF (MGW) node 128 or IBCF (TrGW) node 202. In step 413, the various nodes of the first, second, and/or IMS networks 104, 106, and/or 102 send acknowledgement messages (e.g. a sequence of 200 OK ACK messages) indicating a successful handover of the ECS of UE-A 108 from the first access network 104 to the second access network 106. In step 414, the third EATF node 138c releases the source access legs associated with the first access network 104 as these are not required anymore. In step 415, the ECS has been transferred from the first access network 104 to the second access network 106 such that the UE-A 108 communicates with PSAP 110 via MSC node 122 via an MGCF (MGW) node 128 or IBCF (TrGW) node 202.

It is to be appreciated that the first EATF node 138a may also include or maintain a response list containing EATF nodes that have sent a response message indicating the ECS of UE-A 108 is unknown or not anchored at those EATF nodes (e.g. as was the case with the second EATF node 138b). This response list is used by the first EATF node 138a when selecting further or subsequent EATF nodes by selecting from the set of EATF nodes excluding the network nodes on the response list. If it is determined by the first network node 138a that no EATF node is anchoring the ECS of UE-A 108, that is the set of EATF nodes excluding the EATF nodes on the response list results in an empty or null set, then the first EATF node 138a will send a response message back to the network node that first sent the request for transfer to the first EATF node 138a (e.g. the I-CSCF node 126), in which the response message indicates the ECS of UE-A 108 is unknown to the first EATF node 138a (and/or unknown to the EATF nodes in the response list). Alternatively, the response message from the first EATF node 138a may include an indication rejecting the call such as a 480 SIP response message.

Figure 4B:
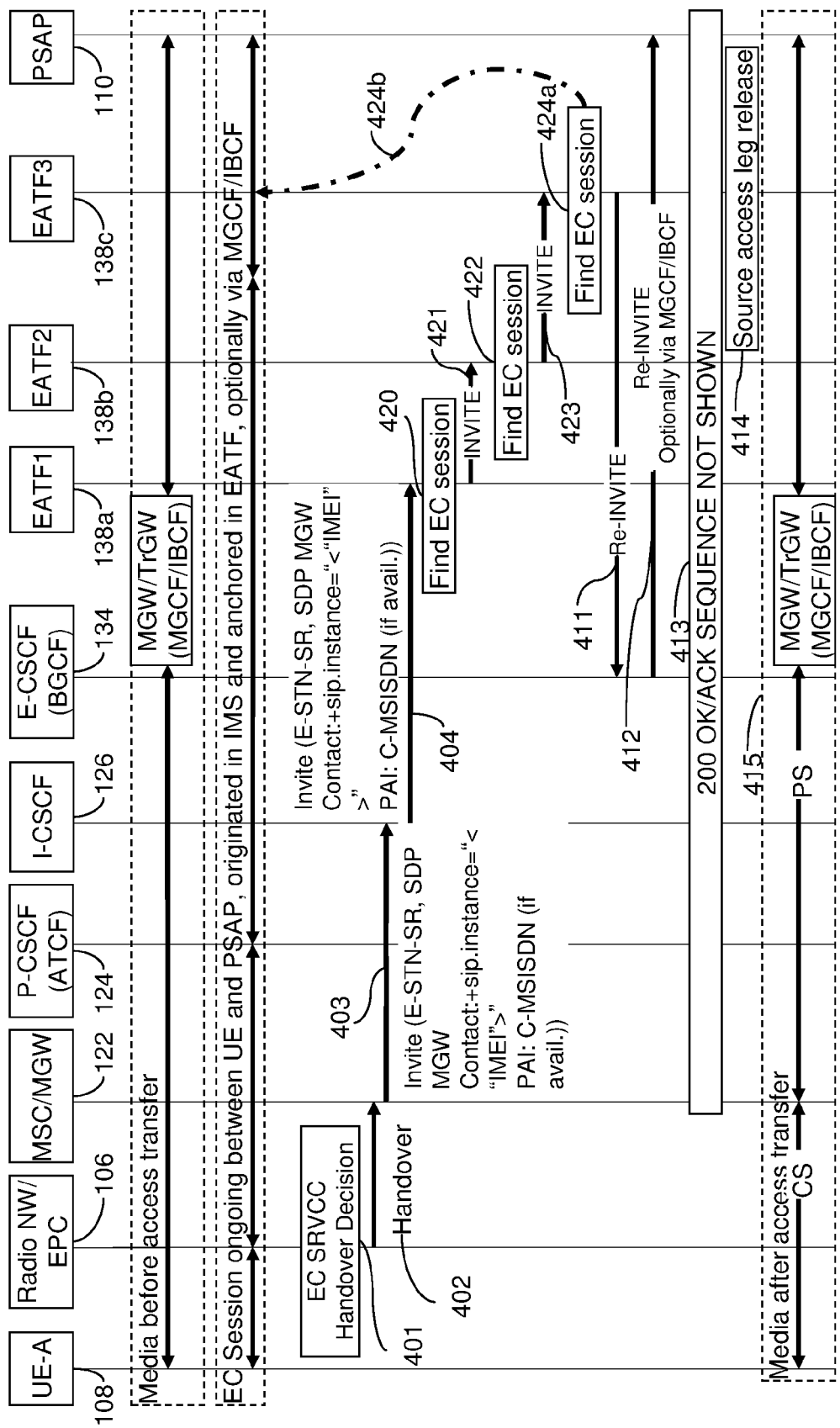
FIG. 4b is a signalling flow diagram illustrating an example of a further solution for enabling an IMS emergency session transfer of an ECS when multiple EATF nodes are present.

FIG. 4b is a signal flow illustrating an example of another solution for enabling a session transfer of an ECS with multiple EATF nodes. It is assumed in this example that the ECS of UE-A 108 has again been anchored at the third EATF node 138c (e.g. EATF3). Steps 401 to 404 are the same as those in relation to FIG. 4a.

In step 420, on receiving the session transfer request in relation to the ECS of UE-A 108, the first EATF node 138a will attempt to find the ECS of UE-A 108 (i.e. look for the anchored ECS) using the IMEI or even the C-MSISDN (if available) that it received in the session transfer request from the I-CSCF node 126. If the first EATF node 138a determines in step 405 that the ECS of UE-A 108 is not anchored or is unknown by the first EATF node 138a, then the first EATF node selects an EATF node from a set of EATF nodes (e.g. the set may include a second EATF node 138b (e.g. EATF2) and a third EATF node 138c (e.g. EATF3)) in which to forward the session transfer request. The set of one or more EATF nodes may be derived using DNS address lists or a locally configured address list. The session transfer request will then be forwarded to the selected EATF node. In this example, the first EATF node 138a selects the second EATF node 138b. In addition to forwarding the session transfer request, the first EATF node 138a will also forward the address of the first EATF node 138a as history information to the second EATF node 138b. This can be used to indicate to the second EATF node 138b that the ECS of UE-A 108 is unknown or not anchored by the first EATF node 138a. In step 421, the first EATF node 138a forwards the session transfer request including the history information (i.e. the address of the first EATF node 138a) to the second EATF node 138b using a SIP INVITE message (e.g. Invite (E-STN-SR, SDP MGW; Contact:+sip.instance="<"IMEI">"; PAI: C-MSISDN (if available); History_info)). As an example, history information (History info) may be included in a header in the SIP INVITE request as a text string that lists information about the nodes the request has passed.

In step 422, on receiving the session transfer request in relation to the ECS of UE-A 108 and the history information (e.g. a list including the address of the first EATF node 138a) from the first EATF node 138a, the second EATF node 138b will attempt to find the ECS of UE-A 108 (i.e. look for the anchored ECS) using the IMEI or even the C-MSISDN (if available) that it received in the session transfer request. As the ECS has not been anchored at the second EATF node 138b either, the second EATF node 138b selects an EATF node from a set of EATF nodes at the second EATF node 138b (e.g. the set may include the first EATF node 138a (EATF1) and the third EATF node 138c (EATF3)), but excluding the EATF node(s) corresponding with the history information. In this case the history information includes data representative of the address or identity of the first EATF node 138a, so the first EATF node 138a will be excluded from the selection. At the second EATF node 138b, the set of one or more EATF nodes excluding the first EATF node 138a results in the third EATF node 138c. The second EATF node will prepare to forward the session transfer request to the third EATF node 138c. In addition to forwarding the session transfer request, the second EATF node 138b will also forward the received history information, which may include data representative of a list of addresses or identities of EATF nodes comprising the address of the first EATF node 138a and the address or identity of the second EATF node 138b. The second EATF node 138b forwards the session transfer request and the history information including data representative of a list of addresses of EATF nodes to the third EATF node 138c. This can be used to indicate to the third EATF node 138c that the ECS of UE-A 108 is unknown or not anchored by the EATF nodes corresponding to the history information (e.g. the first and second EATF nodes 138a and 138b). In step 421, the second EATF node 138b forwards the session transfer request including the history information (e.g. a list of addresses including the address of the first and second EATF nodes 138a and 138b) to the third EATF node 138c using a SIP INVITE message (e.g. Invite (E-STN-SR, SDP MGW; Contact:+sip.instance="<"IMEI">"; PAI: C-MSISDN (if available); History_info)).

In step 424a, on receiving the session transfer request and the history information from the second EATF node 138b, the third EATF node 138c attempts to find the ECS of UE-A (i.e. look for the anchored ECS) using the IMEI or even the C-MSISDN (if available) that it received in the session transfer request. In this case, since the ECS of UE-A 108 is anchored at the third EATF node 138c, the third EATF node 138c in step 424b finds the anchored ECS of UE-A 108 and proceeds to transfer the ECS of UE-A 108 from the first access network 104 to the second access network 106 as outlined with regard to steps 414 to 415 of FIG. 4a.

It is to be appreciated that should the third EATF node 138c not be anchoring the ECS of UE-A 108, then the third EATF node 138c would have selected a subsequent EATF node from a set of one or more EATF nodes excluding the EATF nodes corresponding to the history information (e.g. the list of address of EATF nodes that have already been visited—that is the addresses of the first and second EATF nodes 138a and 138b). The third EATF node 138c would then have forwarded, to the subsequent EATF node, the session transfer request and the received history information (e.g. the list of addresses including the first and second EATF nodes 138a and 138b) including the address of the third EATF node 138c. The procedure would then continue for subsequent EATF nodes with the history information or list of addresses being appended to with the addresses of the subsequent EATF nodes to which the ECS of UE-A 108 is unknown or not anchored.

However, if the ECS of UE-A 108 is unknown or not anchored by the third network node 138c or subsequent EATF nodes, but it is determined that their set of one or more EATF nodes excluding the EATF nodes corresponding to the history information (list of addresses of EATF nodes that do not anchor the ECS of UE-A 108) results in an empty or null set, then the third EATF node 138c or subsequent EATF node would be configured to send a response message back to the network node that sent the request for transfer to the first EATF node 138a, in this case this the I-CSCF node 126, the response message indicating the ECS of UE-A 108 is unknown to the third EATF node 138c or subsequent EATF node. This response message may include the EATF nodes corresponding to the history information. Alternatively, the response message from the third EATF node 138a or subsequent EATF node may include an indication rejecting the call such as a 480 SIP response message.

For simplicity, the same reference numerals used in the previous figures will be reused in the following figures identifying the same or similar network nodes.

Figure 5:
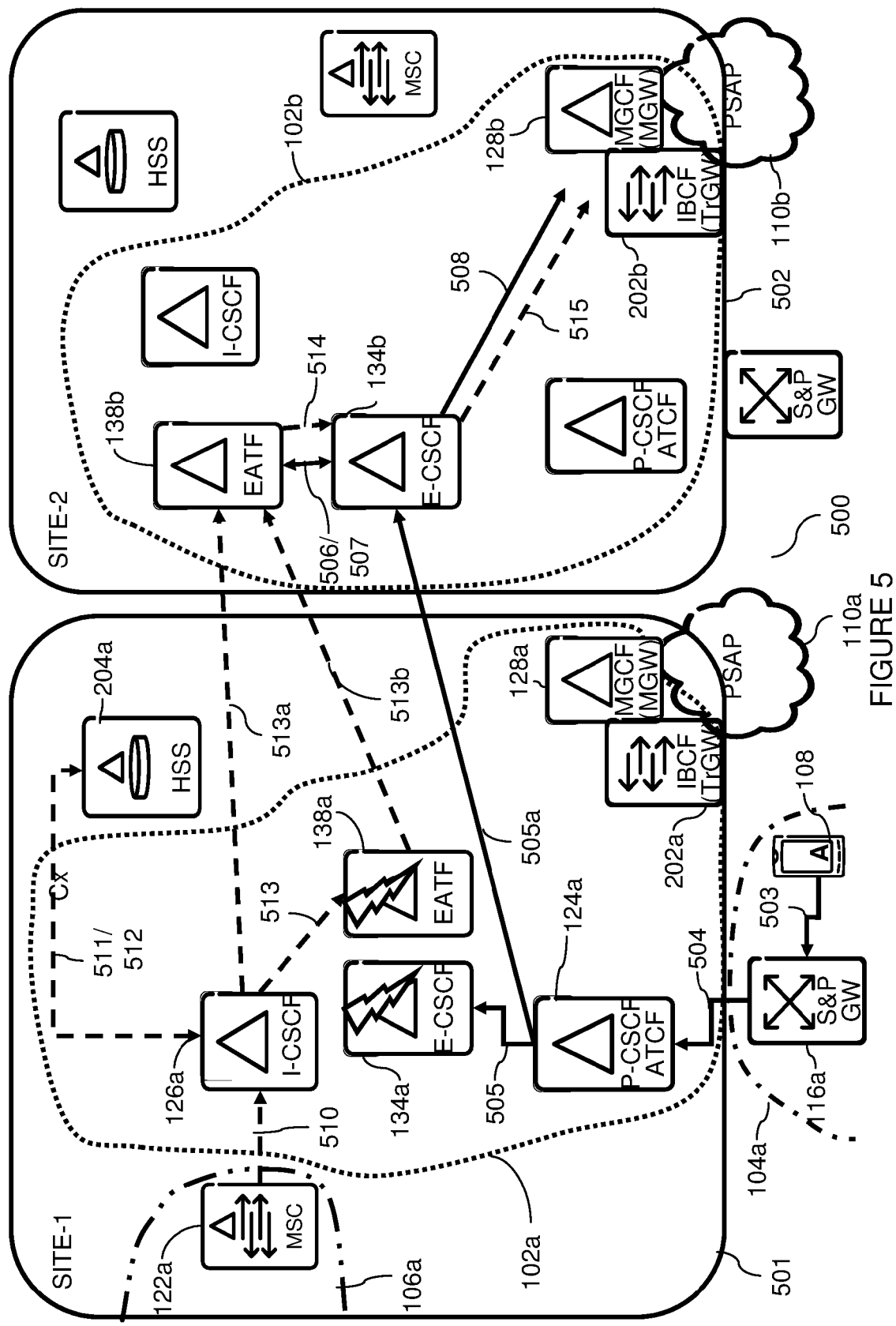
FIG. 5 illustrates schematically an example of a further solution for enabling an IMS emergency session transfer of an ECS when multiple EATF nodes in geographic regions are present.

FIG. 5 illustrates schematically an example of a further solution for enabling an IMS emergency session transfer of an ECS when multiple EATF nodes are present in a communications network 500 having multiple geographic network regions or sites. This provides the advantage of providing geographical EATF node redundancy, which provides protection during an outage, network failure, or an emergency or disaster situation (e.g. terrorist attack or earthquake) of one or more E-CSCF node(s) and/or EATF node(s) located in a first geographic network site such that the E-CSCF nodes and/or EATF nodes located in another geographic network site can handle the ECS of UEs within the first geographic network site until recovery of the outage, network failure, emergency or disaster situation.

Referring to FIG. 5, the communications network 500 includes a first network region 501 (also known as a geographic network site) and a second network region 502. The first network region 501 (e.g. site 1) includes a first access network 104a, a second access network 106a, and a first IMS network 102a. The second network region 502 (e.g. site 2) includes a third access network 104b, a fourth access network 106b, and a second IMS network 102b. For simplicity, only some of the nodes used for IMS EC setup and EC SRVCC signalling are shown. During EC setup, some of the EC set-up signalling between the network nodes is illustrated by solid arrows. During handover, some of the handover or EC SRVCC signalling between network nodes is illustrated by the dashed arrows. It is to be appreciated that there may be intermediary network entities or nodes within the signalling paths shown.

In this example there are two EATF nodes, a first EATF node 138a located in the first network region 501 and a second EATF node 138b located in the second network region 502. It is to be appreciated that each of the first and second network regions 501 and 502 may include one or more further EATF nodes (not shown) as previously described. It is assumed that UE-A 108 (a VoLTE UE) is in communication with the first access network 104a and initiates an EC, where the EC set-up and registration signalling is illustrated in FIG. 5 by solid arrows. The EC set-up and registration signalling is carried out over steps 503 to 508.

In step 503, the UE-A 108 initiates the EC with the first access network 104a such that the EC set-up and registration signalling is routed through to the first S&P GW node 116a, as previously described with reference to FIGS. 2a and/or 2b. The first S&P GW node 116a further routes the EC set-up signalling to a first P-CSCF/ATCF node 124a of the first IMS network 102a. In step 504 the first P-CSCF/ATCF node 124a attempts to send the EC set-up from UE-A 108 to a first E-CSCF node 134a. Normally, as previously described with reference to FIGS. 2a and/or 2b, in step 505a the first P-CSCF/ATCF node 124a would route the EC setup signalling via the first E-CSCF node 134a to the first EATF node 138a such that the EC would be anchored in the first EATF 138a and an ongoing ECS set up between UE-A 108 and PSAP 110a. However, the first E-CSCF node 134a and/or the first EATF node 138a are out of service, represented by the lightening bolts. Instead, the first P-CSCF/ATCF node 124a uses DNS and Service records (SRV) to find the location, e.g. the hostname and port number, of another E-CSCF node and/or EATF node for routing the EC set-up and registration signalling. In this case, in step 505b, the first P-CSCF/ATCF node 124a routes the EC set-up and registration signalling to a second E-CSCF node 134b and a second EATF node 138b located in the second IMS network 102b of the second network region 502.

In steps 506 and 507, the ECS is anchored in the second EATF node 138b due to the failure of the E-CSCF 134a and/or EATF 138a in the first network region 501. The second EATF node 138b is used for anchoring an ECS between the UE-A 108 within the first access network 104a and the second PSAP 110b located in the second network region 502. Once the ECS of UE-A 108 is anchored in the second EATF node 138b, then the ECS between UE-A 108 and the second PSAP 110b is set up (via steps 507 and 508) directly, or indirectly via one of the gateways IBCF (TrGW) 202b or MGCF (MGW) 128b of the second network region 502. The ECS is then established between UE-A 108 of the first access network 104a and PSAP 110b of the second network region 502.

During the ECS, UE-A 108 may move out of the coverage of the first access network such that the first access network 104a may deem that a handover of the ECS to the second access network 106a is necessary and trigger the handover of the ECS. The first access network 104a issues an emergency SRVCC HO request (not shown) to a first MSC node 122a of the second access network 106a (typically via an MME node (not shown)). In step 510, the first MSC node 122a sends, in response to the E-SRVCC HO request, a session transfer request (also known as a handover or transfer request) to a first I-CSCF node 126a in the first IMS network 102a of the first network region 501. In steps 511 and 512, the first I-CSCF node 126a performs a LIR query with a first HSS 204a to retrieve an address of a possible EATF node that may be anchoring the ECS. Typically, since the session transfer request includes the E-STN-SR (locally configured at the MSC 122) in relation to the ECS, the I-CSCF node 126a uses the E-STN-SR as a key when performing the LIR query to the first HSS 204a as the E-STN-SR is an IMS PSI. This is effectively a DNS look-up procedure to identify at least one of the two EATF nodes 138a and 138b that may be anchoring the ECS of UE-A 108. In this example, the first I-CSCF node 126a may receive several addresses of EATF nodes, namely, the first EATF node 138a of the first network region 501 and the second EATF node 138b of the second network region 502.

Normally, in step 513 the first I-CSCF node 126a would send the first EATF node 138a the session transfer request in relation to the ECS of UE 108. However, as the first EATF node 138a is out of service, the first I-CSCF node 126a further selects the second EATF node 138b or uses DNS and SRV and attempt to send the session transfer request to another EATF node, in this case, in step 513a, the first I-CSCF node 126a sends the session transfer request to the second EATF node 138b located in the second network region 502. The second EATF node 138b is configured to determine whether UE-A 108 and/or the ECS are known or anchored at the second EATF node 138b. If the second EATF node 138b determines that it is not the anchoring EATF node in relation to the ECS of UE-A 108, then the second EATF node 138b is further configured to perform one or more of the example methods and solutions, or a combination of the example methods and solutions, as described with reference to FIGS. 2a to 4b to select another EATF node from a set of one or more EATF node(s) (not shown) and forward the session transfer request to the selected EATF node. It is to be appreciated that the set of one or more EATF node(s) may include one or more EATF nodes located in the first network region 501, one or more EATF nodes located in the second network region 502, and/or one or more EATF node(s) located in a further network region (not shown).

In this example, the second EATF node 138b determines on receiving the session transfer request in relation to UE-A 108 that the ECS of UE-A 108 is being anchored by the second EATF node 138b. Once notified, the second EATF node 138b proceeds to perform the session transfer or handover procedure (steps 514 and 515) from the first access network 104a to the second access network 106a such that the ECS between UE-A 108 and the second PSAP 110b continues via the second access network 106a.

If during the ECS, prior to the first access network 104a determining that a handover is required, the first EATF node 138a in the first network region 501 recovers from the outage or network failure and is back in service, in step 513 it may receive the session transfer request from the first I-CSCF node 126a. But, during the outage the ECS of UE-A 108 was actually anchored in the second EATF node 138b in the second network region 502, the first EATF node 138a will not recognize the IMEI included in the session transfer request (handover request) from the first MSC 122a via the first I-CSCF node 126a. Instead, the first EATF node 138a is further configured to perform one or more of the example methods or solutions, or a combination of the example methods or solutions, as described with reference to FIGS. 2a to 4b to select another EATF node from a set of one or more EATF node(s) (not shown) and forward the session transfer request to the selected EATF node. In this case, the first EATF node 138a has a set of one or more EATF nodes that include one or more EATF nodes located in the first network region 501 (not shown), one or more EATF nodes located in the second network region 502 (e.g. the second EATF node 138b), and/or one or more EATF node(s) located in a further network region or regions (not shown).

In this example, since the second EATF node 138b is within the first EATF node's 138a set of EATF nodes, it may be that using similar methods and procedures as described with reference to FIGS. 2a to 4b, that the first EATF node 138a eventually selects the second EATF node 138b when the ECS of UE-A 108 is unknown or not anchored by the first EATF node 138a. In step 513b, the first EATF node 138a forwards the session transfer request for the ECS of UE-A 108 to the second EATF node 138b. The second EATF node 138b then determines on receiving the session transfer request that the ECS of UE-A 108 is being anchored by the second EATF node 138b. Once notified, the second EATF node 138b proceeds to perform the session transfer or handover procedure (steps 514 and 515) from the first access network 104a to the second access network 106a such that the ECS between UE-A 108 and the second PSAP 110b continues via the second access network 106a.

It is to be appreciated that to prevent looping or having session transfer requests being sent between the same EATF nodes, similar methods and procedures as described with reference to FIGS. 2a to 4b may be implemented. As multiple network regions or sites may be deployed throughout an operator's communications network, each EATF node can be configured to have knowledge of further sets of one or more EATF nodes from other network regions. In this case, the first EATF node 138a may include a second set of EATF nodes that are located within the second network region 502 (or secondary site). This can be the same configuration as for the P-CSCF nodes in each network region (or site).

In the case of a complete network failure of E-CSCF nodes and/or EATF nodes within a network region (e.g. site 1 of the first network region 501), then each E-CSCF node and/or EATF node within the network region after recovering from the network failure can be configured to realize that it has been out of service. These nodes can then recognize, based on their own restart state and assuming multiple EATF nodes per network region or site, that they should include EATF nodes from other network regions when selecting a network node from their set of EATF nodes. This recognition may be based on the first reject response from all EATF nodes within the same network region. Alternatively or additionally, the EATF node may be configured to use, in the selection of an EATF node, EATF nodes from another network region for a period of time or for a set time interval. After the period of time has expired, the EATF node may then not involve the EATF nodes from another network region to find the EATF node that is anchoring an ECS for a UE. This provides the advantage of reducing unnecessary loading on the other network regions when each network region is functioning normally.

In particular, with reference to FIG. 5, the first EATF node 138a is located within the first network region 501. The first network region 501 may include one or more EATF nodes (not shown) from the first EATF node's 138a set of EATF nodes. Additionally, the first EATF node 138a may further include a second set of one or more EATF nodes located within the second network region 502. This second set of EATF nodes would include the second EATF node 138b of the second network region 502. After a network failure of the first EATF node 138a, the first network node 138a is further configured to detect a recovery from the network failure within the first network region 501. On detecting the recovery, the first EATF node 138a may be further configured such that the step of selecting further includes the step of selecting another EATF node from both the set of EATF nodes and the second set of EATF nodes. In this case, the first EATF node 138a may select the second EATF node 138 in relation to the session transfer request. The step of selecting another EATF node may further include selecting another EATF node from the set of EATF nodes and the second set of EATF nodes for a period of time after detecting the recovery, and on expiry of said period, selecting another EATF node from only the set of EATF nodes. The step of selecting another EATF node may further include selecting another EATF node from the set of EATF nodes after detecting the recovery, and after receiving responses from the EATF nodes in the set of EATF nodes indicating that the ECS of UE-A 108 is unknown or not anchored by these EATF nodes, then the first EATF node 138b may proceed to select another EATF node from the second set of EATF nodes located in the second network region 502.

Figure 6:
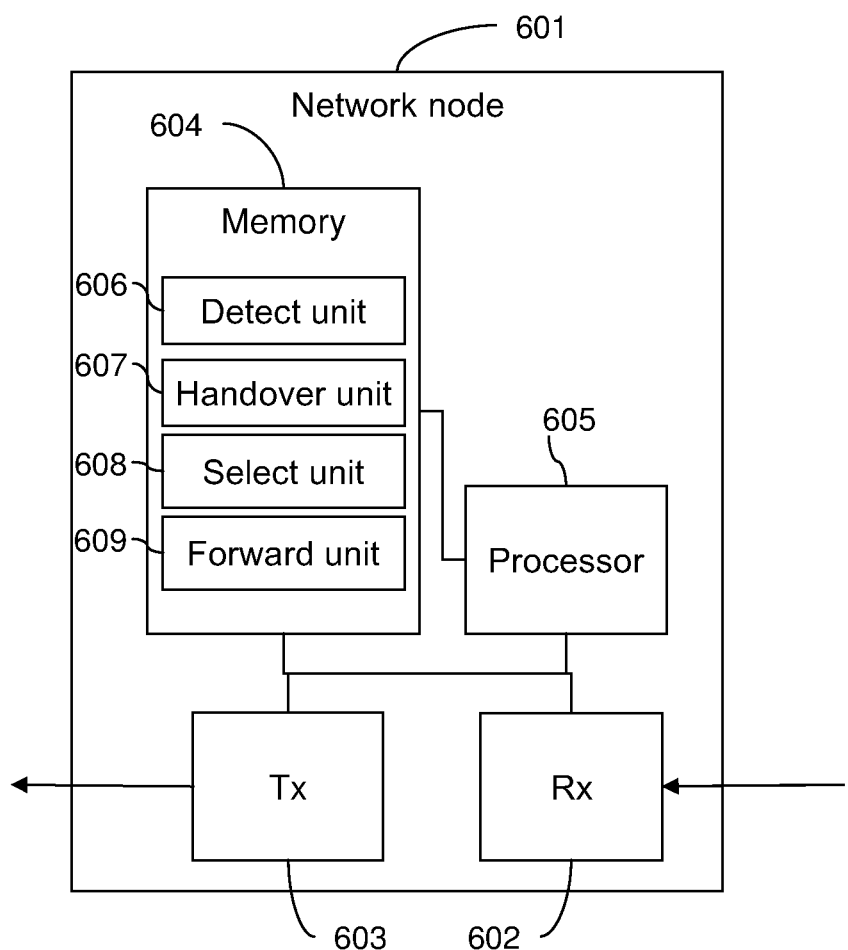
FIG. 6 illustrates schematically an example of a network node suitable for implementing the methods, examples, and solutions described herein.

FIG. 6 illustrates schematically an example of an EATF node 601 suitable for implementing the methods and/or the solutions described above. The EATF node 601 can be implemented as a combination of computer hardware and software, and can be configured to operate as an EATF node in accordance with the solutions described above. The EATF node 601 comprises a receiver 602, a transmitter 603, a memory 604 and a processor 605, which are connected together. The memory 604 stores the various programs/executable files that are implemented by the processor 605 and also provides a storage unit for any required data e.g. data representative of a set of one or more EATF nodes, a response list of one or more EATF nodes, and/or a received list of one or more EATF nodes. The programs/executable files stored in the memory 604, and implemented by processor 605, include on or more of, but are not limited to, a detection unit 606, a handover unit 607, a selection unit 608, and a forwarding unit 609. The detection unit is configured to handle session transfer requests for ECSs of UEs, received by receiver 602, and determine whether each ECS of a UE is known or anchored by the EATF node 601. The handover unit 607 is configured to perform the transfer of the ECS of a UE when the ECS of the UE is known or anchored by the EATF node 601. The selection unit 608 is configured to handle the selection of further EATF nodes from a set of one or more EATF nodes when the ECS of a UE is unknown or not anchored by the EATF node 601. The forwarding unit is configured to forward the session transfer request to the selected further EATF node.

In particular, with reference to FIGS. 1a to 5, the receiver 602 is configured to receive a request for transferring an ECS of UE-A 108 from a first access network 104 to a second access network 106. The processor 605 is configured by handover unit 607 to transfer the ECS of UE-A 108 from the first access network 104 to the second access network 106 when the ECS is known or anchored by the EATF node 601. The processor 605 is further configured by selection unit 608 to select a second EATF node 138b from a set of one or more EATF nodes when the ECS of UE-A 108 is unknown or not anchored by EATF node 601. The forwarding unit 609 and the transmitter 603 are further configured to forward the request for transferring the ECS of UE-A 108 to the second EATF node 138b. The processor 605 may be further configured by the detection unit 606 to determine whether the ECS of UE-A is known or anchored by EATF node 601;

In addition, the forwarding unit 609 (and hence processor 605) may be further configured to include the address of the EATF node 601 in the request for transferring the ECS such that the transmitter 603 is configured to forward the request for transferring the ECS including the address of the EATF node 601 to the second EATF node 138b.

Should the EATF node 601 receive a response from the second EATF node 138b indicating the ECS is unknown to or not anchored by the second EATF node 138b, then the selection unit 608 (and hence the processor 605) is further configured to select a third EATF node 138c from the set of EATF nodes excluding the second EATF node 138b. The forwarding unit 609 and transmitter 603 are further configured to forward the request for transferring the ECS to the third EATF node 138c. As described above, this may continue unit the set of EATF nodes excluding the EATF nodes that have respond to the EATF node 601 results in an empty set.

The processor 605 is further configured to maintain a response list of EATF nodes that have indicated to the EATF node 601 that the ECS of UE-A 108 is unknown or not anchored. Should this be the case, the selection unit 608 (and hence processor 605) is further configured select another EATF node from the set of EATF nodes excluding the EATF nodes in the response list.

Alternatively or additionally the receiver 602 may be further configured to receive a request for transferring the ECS of UE-A 108 including data representative of a list of one or more EATF node addresses or identities. The list of one or more EATF node identities or address(es) includes the EATF nodes to which the ECS of UE-A 108 is unknown or not anchored.

The selection unit 608 and the processor 605 are further configured to select another EATF node from the set of EATF nodes excluding the EATF nodes corresponding to the received list of one or more EATF nodes where the ECS is unknown to the EATF node 601. The forwarding unit 609 (and hence the transmitter 603) is further configured to forward, to the selected node, the request for transferring the ECS of UE-A 108 and data representative of the list of one or more EATF node addresses or identities including data representative of the address or identity of EATF node 601. In addition, the EATF node 601 may further include a second set of one or more EATF nodes located within a second network region 502, where the set of one or more EATF nodes correspond to EATF nodes located in a first network region 501.

The detection unit 606 (and processor 605) may be further configured to detect a recovery from a network failure within the first network region 501. The selection unit 608 (and processor 605) may be further configured to select another EATF node from the set of EATF nodes and the second set of EATF nodes when the ECS of UE-A 108 is unknown or not anchored by the EATF node 601. The selection unit 608 may be further configured to select another EATF node from the set of EATF nodes and the second set of EATF nodes for a period of time after detecting the recovery, and on expiry of said period, select a further EATF node from only the set of EATF nodes. Alternatively or additionally, the selection unit 608 may be further configured to select another EATF node from the set of EATF nodes after detecting the recovery, and after receiving responses from the EATF nodes in the set of EATF nodes indicating to the EATF node 601 that the ECS of UE-A 108 is unknown or not anchored, and then selecting a further EATF node from the second set of EATF nodes.

It will be appreciated to the person of skill in the art that various types of access networks may be envisaged for the first and second access networks 104 and 106. For example, the first access network 104 may be any packet-switched access network including, but not limited to, a LTE/LTE Advanced access network or an EPC controlled radio access network or similar, and the second access network 106 may be a circuit switched access network including, but not limited to, a GSM/WCDMA access network or similar. It will be appreciated by the person of skill in the art that various modifications may be made to the above-described embodiments without departing from the scope of the present invention. For example, whilst the above-described embodiments refer to specific entities or nodes within an IMS network, such as the E-CSCF node(s), EATF node(s), and I-CSCF node(s), it is possible that the names used to refer to one of more of these entities or nodes could change, or that the functionality of one or more of these entities or nodes are combined with that of another entity.

Although the invention has been described in terms of example solutions or preferred embodiments as set forth above, it should be understood that these examples or embodiments are illustrative only and that the claims are not limited to only those examples or embodiments. Those skilled in the art will be able to make modifications and alternatives in view of the disclosure which are contemplated as falling within the scope of the appended claims. Each of the features, steps, or nodes disclosed or illustrated in the present specification may be incorporated into the invention, whether alone or in any appropriate combination with any other feature, step, or node disclosed or illustrated herein.

The invention claimed is:

1. A method of operating a first emergency access transfer function (EATF) node, the method comprising:
   receiving a request for transferring an emergency call session (ECS) of a user equipment (UE) from a first access network to a second access network;
   transferring the ECS from the first access network to the second access network when the ECS is known to the first EATF node;
   selecting a second EATF node from a set of one or more EATF nodes when the ECS is unknown to the first EATF node; and
   forwarding the request for transferring the ECS to the second EATF node.

2. The method as claimed in claim 1, further comprising the step of determining whether the ECS is known to the first EATF node.

3. The method as claimed in claim 1, wherein the step of forwarding the request further comprises including data representative of an address or identity of the first EATF node in the request for transferring the ECS to the second EATF node.

4. The method as claimed in claim 1, further comprising the steps of:
receiving a response from the second EATF node indicating the ECS is unknown to the second EATF node;
selecting a third EATF node from the set of EATF nodes excluding the second EATF node; and
forwarding the request for transferring the ECS to the third EATF node.

5. The method as claimed in claim 1, further comprising the step of maintaining a response list of EATF nodes that have indicated to the first EATF node that the ECS is unknown, wherein the step of selecting further comprises selecting from the set of EATF nodes excluding the EATF nodes in the response list.

6. The method as claimed in claim 5, further comprising the step of transmitting, to a network node that sent the transfer request to the first EATF node, a response message indicating the ECS is unknown to the first EATF node when the set of EATF nodes excluding the EATF nodes corresponding to the response list is an empty set.

7. The method as claimed in claim 1, further comprising the steps of:
receiving a request for transferring the ECS including data representative of a list of one or more addresses or identities of EATF nodes;
selecting the second EATF node from the set of EATF nodes excluding the EATF nodes corresponding to the received list where the ECS is unknown to the first EATF node; and
forwarding, to the second EATF node, the request for transferring the ECS including the received list and data representative of the address or identity of the first EATF node.

8. The method as claimed in claim 7, further comprising the step of transmitting, to a network node that sent the transfer request to the first EATF node, a response message indicating the ECS is unknown to the first EATF node when the set of EATF nodes excluding the EATF nodes corresponding to the received list is an empty set.

9. The method as claimed in claim 1, wherein the first EATF node is located within a first network region including the one or more EATF nodes from the set of EATF nodes, the first EATF node including a second set of one or more EATF nodes located within a second network region, the method further comprising:
detecting a recovery from a network failure within the first network region; and
the step of selecting further comprises selecting the second EATF node from the set of EATF nodes and the second set of EATF nodes.

10. The method as claimed in claim 9, wherein the step of selecting the second EATF node further comprises selecting the second EATF node from the set of EATF nodes and the second set of EATF nodes for a period of time after detecting the recovery, and on expiry of said period, selecting the second EATF node from only the set of EATF nodes.

11. The method as claimed in claim 9, wherein the step of selecting the second EATF node further comprises selecting the second EATF node from the set of EATF nodes after detecting the recovery, and after receiving responses from the EATF nodes in the set of EATF nodes indicating that the ECS is unknown, selecting another EATF node from the second set of EATF nodes.

12. The method as claimed in claim 1, further comprising the step of transmitting, to a network node that sent the transfer request to the first EATF node, a request for removing the first EATF node from the session path of the ECS when the ECS is unknown to the first EATF node.

13. The method as claimed in claim 1, wherein the first access network is a packet switched network and the second access network is a circuit switched network.

14. An emergency access transfer function (EATF) node, the EATF node comprising:
a receiver, a transmitter, a memory, and a processor, the processor being connected to the receiver, to the transmitter, and to the memory, wherein:
the receiver is configured to receive a request for transferring an emergency call session (ECS) of a user equipment (UE) from a first access network to a second access network;
the processor is configured to:
transfer the ECS of the UE from the first access network to the second access network when the ECS is known to the EATF node;
select a second EATF node from a set of one or more EATF nodes when the ECS is unknown to the EATF node; and
the transmitter is configured to forward the request for transferring the ECS to the second EATF node.

15. The EATF node as claimed in claim 14, wherein the processor is further configured to determine whether the ECS is known to the EATF node.

16. The EATF node as claimed in claim 14, wherein:
the processor is further configured to include an address or identity of the EATF node in the request for transferring the ECS; and
the transmitter is further configured to forward, to the second EATF node, the request for transferring the ECS including data representative of the address or identity of the EATF node.

17. The EATF node as claimed in claim 14, wherein:
the receiver is further configured to receive a response from the second EATF node indicating the ECS is unknown to the second EATF node;
the processor is further configured to select a third EATF node from the set of EATF nodes excluding the second EATF node; and
the transmitter is further configured to forward the request for transferring the ECS to the third EATF node.

18. The EATF node as claimed in claim 14, wherein the processor is further configured to maintain a response list of EATF nodes that have indicated to the EATF node that the ECS is unknown, wherein the processor is further configured to select from the set of EATF nodes excluding the EATF nodes in the response list.

19. The EATF node as claimed in claim 14, wherein:
the receiver is further configured to receive a request for transferring the ECS including data representative of a list of one or more EATF node addresses or identities;
the processor is further configured to select the second EATF node from the set of EATF nodes excluding the EATF nodes corresponding to the received list where the ECS is unknown to the EATF node; and
the transmitter is further configured to forward, to the second EATF node, the request for transferring the ECS and the list of one or more EATF node addresses including data representative of the address or identity of the EATF node.

20. The EATF node as claimed in claim 14, wherein the EATF node is located within a first network region including the one or more EATF nodes from the set of one or more EATF nodes and the EATF node includes a second set of one or more EATF nodes located within a second network region, and wherein the processor is further configured to:
- detect a recovery from a network failure within the first network region; and
- select the second EATF node from the set of EATF nodes and the second set of EATF nodes.

21. The EATF node as claimed in claim 20, wherein the processor is further configured to select the second EATF node from the set of EATF nodes and the second set of EATF nodes for a period of time after detecting the recovery, and on expiry of said period, select the second EATF node from only the set of EATF nodes.

22. The EATF node as claimed in claim 20, wherein the processor is further configured to select the second EATF node from the set of EATF nodes after detecting the recovery, and after receiving responses from the EATF nodes in the set of EATF nodes indicating to the EATF node that the ECS is unknown, to select the second EATF node from the second set of EATF nodes.

23. The EATF node as claimed in claim 14, wherein the processor and transmitter are further configured to transmit, to a network node that sent the transfer request to the EATF node, a request for removing the EATF node from the session path of the ECS when the ECS is unknown to the EATF node.

24. The EATF node as claimed in claim 14, wherein the first access network is a packet switched network and the second access network is a circuit switched network.

* * * * *